(12) United States Patent
Ray

(10) Patent No.: US 10,324,168 B2
(45) Date of Patent: Jun. 18, 2019

(54) SYSTEMS AND METHODS FOR SPATIAL FILTERING USING DATA WITH WIDELY DIFFERENT ERROR MAGNITUDES

(71) Applicant: THE BOEING COMPANY, Chicago, IL (US)

(72) Inventor: Gary Alan Ray, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 292 days.

(21) Appl. No.: 15/262,967

(22) Filed: Sep. 12, 2016

(65) Prior Publication Data
US 2018/0074170 A1 Mar. 15, 2018

(51) Int. Cl.
*G01S 5/02* (2010.01)
*G01S 5/12* (2006.01)
(Continued)

(52) U.S. Cl.
CPC .......... *G01S 7/2923* (2013.01); *G01S 5/0278* (2013.01); *G01S 5/12* (2013.01); *G01S 7/006* (2013.01);
(Continued)

(58) Field of Classification Search
CPC ............ G01S 13/56; G01S 13/62; G01S 5/12; G01S 7/2923; G01S 13/878;
(Continued)

(56) References Cited

U.S. PATENT DOCUMENTS 5,179,529 A 1/1993 Nowakowski
5,263,051 A 11/1993 Eyuboglu
(Continued)

FOREIGN PATENT DOCUMENTS

EP 2988148 A1 2/2016
JP 2001264417 A 9/2001
(Continued)

OTHER PUBLICATIONS

Lan-Da Van, Pipelining and Parallel Processing, Department of Computer Science National ChiaoTung University, Taiwan, 2010.
(Continued)

*Primary Examiner* — Olumide Ajibade Akonai
(74) *Attorney, Agent, or Firm* — Armstrong Teasdale LLP

(57) ABSTRACT

A method for spatially filtering data includes receiving a plurality of signal parameter vectors including spatial-type information derived from a sensor and associated with a signal emitter, determining error magnitudes of a plurality of first and second coordinates, and transmitting the plurality of coordinates to at least two arrays of differing sparsity in an array data structure when the error magnitudes differ by a predetermined amount, where each array is representative of a physical spatial domain from which a plurality of signals are received by the sensor. The method also includes determining a plurality of elliptical error region probability objects representative of probability density functions of the plurality of coordinates, where each object is stored in association with at least one of the at least two arrays, and determining an intersection region between the plurality of objects that is representative of a location of the signal emitter.

29 Claims, 18 Drawing Sheets

(51) Int. Cl.
  *G01S 7/00* (2006.01)
  *G01S 7/06* (2006.01)
  *G01S 13/56* (2006.01)
  *G01S 13/62* (2006.01)
  *G01S 7/292* (2006.01)
  *G06F 16/29* (2019.01)

(52) U.S. Cl.
  CPC ............... *G01S 7/06* (2013.01); *G01S 13/56* (2013.01); *G01S 13/62* (2013.01); *G06F 16/29* (2019.01)

(58) Field of Classification Search
  CPC .......... G01S 5/0278; G01S 7/006; G01S 5/02; G01S 13/003; G01S 13/723; G01S 13/726; G01S 15/876; G01S 2013/466; G01S 2013/468; G01S 2015/465; G01S 19/42; G01S 5/0252; G01C 21/00; H04W 64/00; G06F 17/18
  See application file for complete search history.

(56) References Cited

U.S. PATENT DOCUMENTS

| | | | |
|---|---|---|---|
| 5,754,783 | A | 5/1998 | Mendelson et al. |
| 5,889,791 | A | 3/1999 | Yang |
| 5,999,129 | A | 12/1999 | Rose |
| 6,041,393 | A | 3/2000 | Hsu |
| 6,043,771 | A | 3/2000 | Clark et al. |
| 6,147,646 | A | 11/2000 | Arneson et al. |
| 6,205,190 | B1 | 3/2001 | Antonio et al. |
| 6,285,319 | B1 | 9/2001 | Rose |
| 6,351,456 | B1 | 2/2002 | Struhsaker et al. |
| 6,545,633 | B1* | 4/2003 | Jensen ............... G01S 13/003 342/118 |
| 6,711,528 | B2 | 3/2004 | Dishman et al. |
| 6,744,744 | B1 | 6/2004 | Tong et al. |
| 6,898,612 | B1 | 5/2005 | Parra et al. |
| 6,985,102 | B1 | 1/2006 | Horn et al. |
| 7,397,415 | B1 | 7/2008 | Wang et al. |
| 8,805,858 | B1 | 8/2014 | Ray |
| 8,958,750 | B1 | 2/2015 | Saleem et al. |
| 9,081,092 | B1 | 7/2015 | Friesel |
| 9,273,965 | B2* | 3/2016 | Cody ................. G01C 21/00 |
| 2002/0035709 | A1 | 3/2002 | Chen et al. |
| 2002/0121890 | A1 | 9/2002 | Levitt |
| 2002/0168035 | A1 | 11/2002 | Carlson et al. |
| 2003/0023909 | A1 | 1/2003 | Ikeda et al. |
| 2003/0079170 | A1 | 4/2003 | Stewart et al. |
| 2003/0095716 | A1 | 5/2003 | Gindele et al. |
| 2003/0096586 | A1 | 5/2003 | Oates et al. |
| 2003/0221084 | A1 | 11/2003 | Zhou |
| 2004/0027257 | A1 | 2/2004 | Yannone et al. |
| 2004/0158821 | A1 | 8/2004 | Rickard et al. |
| 2004/0204922 | A1 | 10/2004 | Beadle et al. |
| 2008/0198914 | A1 | 8/2008 | Song |
| 2009/0060008 | A1 | 3/2009 | Beadle |
| 2010/0309055 | A1 | 12/2010 | Middour et al. |
| 2011/0178979 | A1* | 7/2011 | Nakagawa ............. G01S 5/02 706/54 |
| 2012/0280848 | A1 | 11/2012 | Card et al. |
| 2013/0021197 | A1 | 1/2013 | Jiang |
| 2014/0354647 | A1* | 12/2014 | Verret ................ G06T 19/20 345/427 |
| 2016/0314097 | A1* | 10/2016 | Bradford ............... G06F 17/18 |

FOREIGN PATENT DOCUMENTS

| | | |
|---|---|---|
| JP | 2015187575 A | 10/2015 |
| WO | 9858450 A1 | 12/1998 |

OTHER PUBLICATIONS

Mark Wickert, ECE2610 Signals and Systems lecture notes, Chapter 8 IIR Filters, Apr. 19, 2010.

A. Kurzhanskiy & P. Varaiya, Ellipsoidal Toolbox Technical Report, 2006.

M. Friendly et al., Elliptical Insights: Understanding Statistical Methods through Elliptical Geometry, Statistical Science, vol. 28, No. 1, 1-39 (2013).

An FPGA Implementation of Incremental Clustering for Radar Pulse Deinterleaving, Scott Bailie, MS Thesis, Northeastern Univ., Apr. 2010.

S. Bailie & M. Leeser, Incremental applied to radar deinterleaving: a parameterized FPGA implementation, FPGA '12 Proceedings of the ACM/SIGDA international symposium on Field Programmable Gate Arrays, pp. 25-28, ISBN 978-1-4503-1155-7, abstract available at http://dl.acm.org/citation.cfm?id=2145699.

Pandu, J., Balaji, N., Naidu, C.D., FPGA implementation of multi parameter deinterleaving, 2014 International Conference on Electronics and Communications Systems (ICECS), Feb. 13-14, 2014, ISBN 978-1-4799-2320-5, abstract available at http://ieeexplore.ieee.org/document/6892676/.

Singh, A.K. & Rao, K.S., Detection, Identification & Classification of Intra Pulse Modulated LPI Radar Signal using Digital Receiver, International Journal of Emerging Technology and Advanced Engineering, vol. 2, Issue 9, Sep. 2012.

Kumar.N et al., Deinterleaving of Radar Signals and its Parameter Estimation in EW Environment, International Journal of Emerging Technology and Advanced Engineering, vol. 4, Issue 9, Sep. 2014.

Mahmoud et al., Radar Parameter Generation to Identify the Target, Journal of Engineering, vol. 17, Feb. 2011, available at http://www.iasj.net/iasj?func=fulltext&ald=24384.

Babcock et al., Sampling From a Moving Window Over Streaming Data, SODA '02 Proceedings of the thirteenth annual ACM-SIAM symposium on Discrete algorithms, pp. 633-634, abstract available at http://dl.acm.org/citation.cfm?id=545465.

Lakshmi et al., Detection and Extraction of Radio Frequency and Pulse Parameters in Radar Warning Receivers, Proceedings of International Conference on Emerging Research in Computing, Information , Communication an Applications (ERCICA 2013), Aug. 2013, ISBN 978-9-3510-7102-0, available at http://searchdl.org/public/book_series/elsevierst/1/97.pdf.

Guassianwaves.com—Signal Processing Simplified, Interleavers and deinterleavers, Oct. 25, 2010, http://www.gaussianwaves.com/2010/10/interleavers-and-deinterleavers-2/.

J.D. Parker, Deinterleaver Technology for Future Electronic Support Measures (ESM) Systems, Naval Surface Warfare Center, Dec. 1992, available at http://www.dtic.mil/dtic/tr/fulltext/u2/a265005.pdf.

SysBrain, Users Manual—Reference of the Geometric Bounding Toolbox (GBT) Version 7.3, http://www.sysbrain.com/gbt/gbt/gbt7man.pdf.

K. Fischer et al., Computational Geometry Algorithms Library (CGAL), Reference Manual, Bounding Volumes Reference, http://doc.cgal.org/latest/Bounding_volumes/group_PkgBoundingVolumes.html.

U.S. Appl. No. 15/073,626, filed Mar. 17, 2016.

EPO Extended Search Report for related application 17181686.1 dated Aug. 21, 2017, 9 pp.

Extended European Search Report for Application No. 17174816.3, dated Jan. 9, 2018, 7 pages.

Extended European Search Report for Application No. 17179448.0. dated Jan. 19, 2018, 9 pages.

Jiang, L. et al., Pulse-Compression Radar Signal Sorting Using th Blind Source Separation Algrithms, 2015 International Conference on Estimation, Detection and Information Fusion, IEEE, pp. 268-271.

Shy, K. et al., Implementation of Pipelined FastICA on FPGA for Real-Time Blind Source Separation, Jun. 2008, IEEE Transaction on Neural Networks, vol. 19, No. 6, pp. 958-970.

EPO Extended Search Report for related application 17181675.4 dated Aug. 17, 2017, 11 pp.

European Office Action for Patent Application Serial No. 17 181 675.4-1217 dated Dec. 18, 2018; pp. 1-8.

* cited by examiner

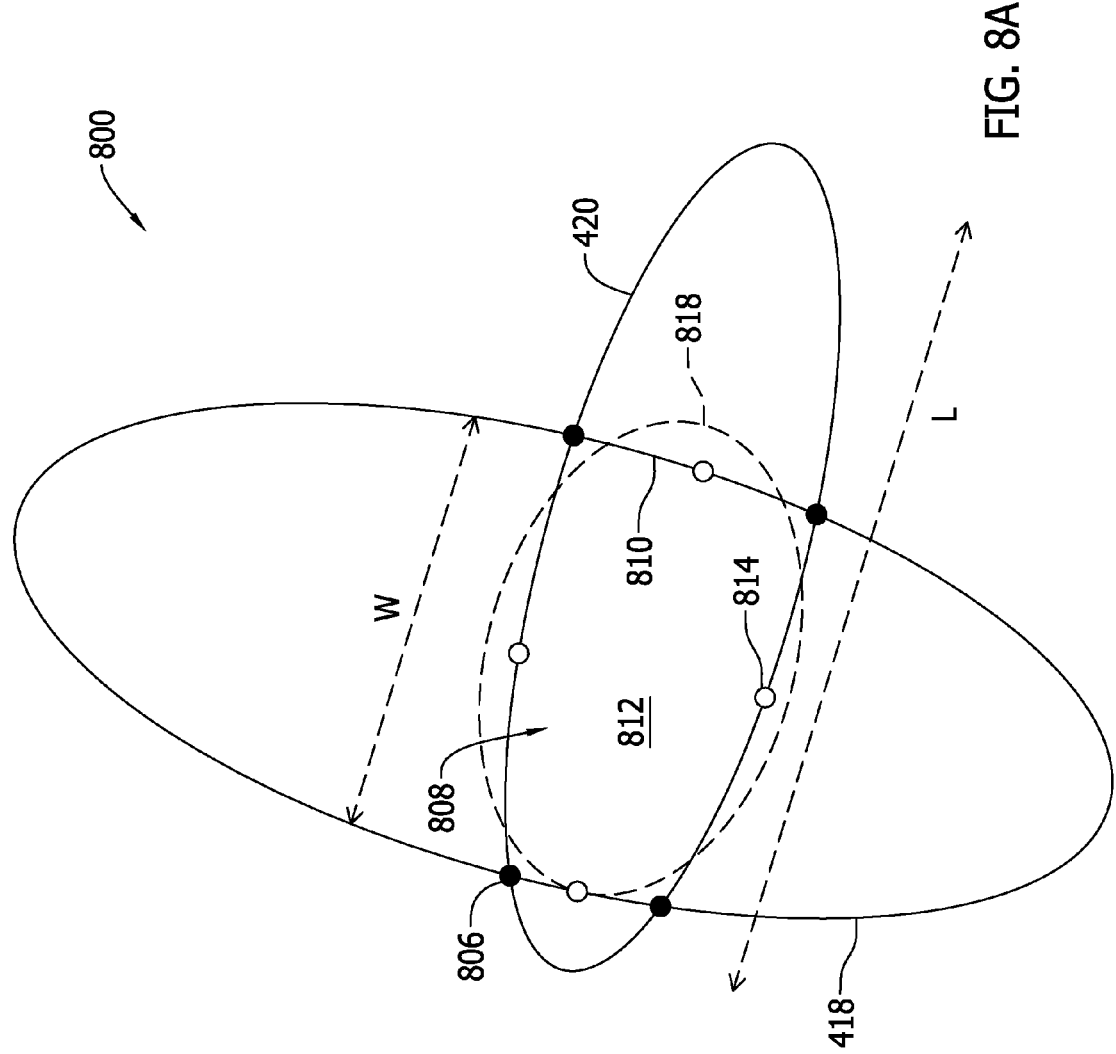

SYSTEMS AND METHODS FOR SPATIAL FILTERING USING DATA WITH WIDELY DIFFERENT ERROR MAGNITUDES

BACKGROUND

The field of the disclosure relates generally to filtering of spatial signal data, and, more specifically, to systems and methods for spatial filtering using data generated by wide area surveillance sensors and having widely different error magnitudes.

In known spatial data filtering systems and methods, reception and classification of signals is challenging where spatial data (e.g., pulse descriptor words (PDWs) in radar sensing applications) having different numbers of dimensions and widely different error magnitudes are obtained from one or more wide area sensors. In such known spatial filtering systems and methods, separation of signal from noise and interference is also problematic where the number of signals of interest is large and spatial content is a priority for classification purposes. In such known systems and methods, fusing multiple sensors having varying degrees of spatial error (e.g., ranging from very sparse to very fine spatial resolution) together for processing is inefficient absent highly complex, expensive, and memory-intensive computing architectures. The problem is compounded when known spatial filtering systems and methods require cancellation of noise and interference in order to spatially match information between sampling frames. Also, in at least some known spatial data filtering systems and methods, including those deployed in aerial surveillance operations where size, weight, and power requirements are important design considerations, improving detection range, processing and classification performance, and reducing power consumption requires increasing computation resources. Computing resources necessary for such enhancements exceed size and weight limitations for aerial surveillance platforms in at least some known spatial data filtering systems and methods, making it problematic to achieve the aforementioned improvements.

At least some known spatial data filtering systems and methods employ pre-conditioning steps such as denoising and blind source separation prior to spatial filtering, distinct methodologies and systems to process data sets with widely varying error magnitudes leads to various inefficiencies, including in accurately matching spatial data to grids of varying sparseness. Further, at least some known spatial data filtering systems and methods are unable, absent highly sophisticated, complex, and expensive post-processing architectures, to statistically join together over time spatial data-containing vectors derived from wide area sensors and having different numbers of dimensions and widely varying error magnitudes. Finally, in this context, at least some known spatial data filtering systems and methods have difficulty discerning between stationary and moving signal emitters with an acceptable error using spatial data obtained from wide area sensors.

BRIEF DESCRIPTION

In one aspect, a method is provided for spatially filtering data from a plurality of signal parameter vectors generated by at least one surveillance platform including at least one sensor configured to receive a plurality of signals from a signal emitter, each signal parameter vector derived from one signal of the plurality of signals. The method includes receiving, over time including at a first time and at a second time occurring after the first time, the plurality of signal parameter vectors at a computing device configured to deinterleave each signal parameter vector of the plurality of signal parameter vectors, the each signal parameter vector having at least one coordinate including information derived from the at least one sensor and associated with the signal emitter, where the information includes at least two types of spatial data including a first spatial data type and a second spatial data type. The method also includes determining a first error magnitude of a plurality of first coordinates of the first spatial data type and a second error magnitude of a plurality of second coordinates of the second spatial data type. The method further includes transmitting, to an array data structure stored in a memory and having a plurality of arrays, the plurality of first coordinates to a first array of the plurality of arrays and the plurality of second coordinates to a second array of the plurality of arrays when the first error magnitude differs from the second error magnitude by a predetermined amount, where the first array includes a first number of elements and the second array includes a second number of elements different from the first number of elements, and where each array of the plurality of arrays is representative of a physical spatial domain from which the plurality of signals are received by the at least one sensor. The method also includes determining, with the computing device, a plurality of elliptical error region probability objects including a first elliptical error region probability object representative of a first probability density function (PDF) of the plurality of first coordinates and a second elliptical error region probability object representative of a second PDF of the plurality of second coordinates, where each of the first elliptical error region probability object and the second elliptical error region probability object is stored in the memory in association with at least one of the first array and the second array. The method further includes determining, with the computing device, an intersection region including at least a portion of the first elliptical error region probability object and at least a portion of the second elliptical error region probability object, where the intersection region further includes at least a portion of the first number of elements and at least a portion of the second number of elements, and where the intersection region is representative of a highest probability location of the signal emitter in the physical spatial domain at the second time.

In another aspect, a system is provided for spatially filtering data derived from a plurality of signals generated by a signal emitter and received by at least one surveillance platform. The system includes at least one sensor configured to receive the plurality of signals. The system also includes a pre-processor coupled to the sensor and configured to generate a plurality of signal parameter vectors, each signal parameter vector of the plurality of signal parameter vectors derived from one signal of the plurality of signals and including at least one coordinate including information derived from the at least one sensor and associated with the signal emitter, where the information includes at least two types of spatial data including a first spatial data type and a second spatial data type. The system further includes a computing device coupled to the pre-processor and including a memory, the computing device configured to deinterleave the each signal parameter vector of the plurality of signal parameter vectors, where the computing device is programmed to receive, over time including at a first time and at a second time occurring after the first time, the plurality of signal parameter vectors from the pre-processor. The computing device is also programmed to determine a first error magnitude of a plurality of first coordinates of the first spatial data type and a second error magnitude of a plurality of second coordinates of the second spatial data type. The computing device is further programmed to transmit, to an array data structure stored in the memory and having a plurality of arrays, the plurality of first coordinates to a first array of the plurality of arrays and the plurality of second coordinates to a second array of the plurality of arrays when the first error magnitude differs from the second error magnitude by a predetermined amount, where the first array includes a first number of elements and the second array includes a second number of elements different from the first number of elements, and where each array of the plurality of arrays is representative of a physical spatial domain from which the plurality of signals are received by the at least one sensor. The computing device is also programmed to determine a plurality of elliptical error region probability objects including a first elliptical error region probability object representative of a PDF of the plurality of first coordinates and a second elliptical error region probability object representative of a second PDF of the plurality of second coordinates, where each of the first elliptical error region probability object and the second elliptical error region probability object is stored in the memory in association with at least one of the first array and the second array. The computing device is further programmed to determine an intersection region including at least a portion of the first elliptical error region probability object and at least a portion of the second elliptical error region probability object, where the intersection region further includes at least a portion of the first number of elements and at least a portion of the second number of elements, and where the intersection region is representative of a highest probability location of the signal emitter in the physical spatial domain at the second time.

In yet another aspect, a non-transient computer-readable memory having computer-executable instructions embodied thereon is provided. When executed by a computing device, the computer-readable instructions cause the computing device to receive, over time including at a first time and at a second time occurring after the first time, a plurality of signal parameter vectors including a plurality of first coordinates of a first spatial data type and a plurality of second coordinates of a second spatial data type, each signal parameter vector of the plurality of signal parameter vectors derived from one signal of a plurality of signals generated by a signal emitter and received by at least one sensor. The computer-readable instructions also cause the computing device to determine a first error magnitude of a plurality of first coordinates and a second error magnitude of a plurality of second coordinates. The computer-readable instructions further cause the computing device to transmit, to an array data structure stored in the memory and having a plurality of arrays, the plurality of first coordinates to a first array of the plurality of arrays and the plurality of second coordinates to a second array of the plurality of arrays when the first error magnitude differs from the second error magnitude by a predetermined amount, where the first array includes a first number of elements and the second array includes a second number of elements different from the first number of elements, and where each array of the plurality of arrays is representative of a physical spatial domain from which the plurality of signals are received by the at least one sensor. The computer-readable instructions also cause the computing device to determine a plurality of elliptical error region probability objects including a first elliptical error region probability object representative of a first PDF of the plurality of first coordinates and a second elliptical error region probability object representative of a second PDF of the plurality of second coordinates, where each of the first elliptical error region probability object and the second elliptical error region probability object is stored in the memory in association with at least one of the first array and the second array. The computer-readable instructions further cause the computing device to determine an intersection region including at least a portion of the first elliptical error region probability object and at least a portion of the second elliptical error region probability object, where the intersection region further includes at least a portion of the first number of elements and at least a portion of the second number of elements, and where the intersection region is representative of a highest probability location of the signal emitter in the physical spatial domain at the second time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8A is an exemplary plot of a four point ellipsoid intersection as determined by the signal processing system shown in FIG. 3.

Figure 1:
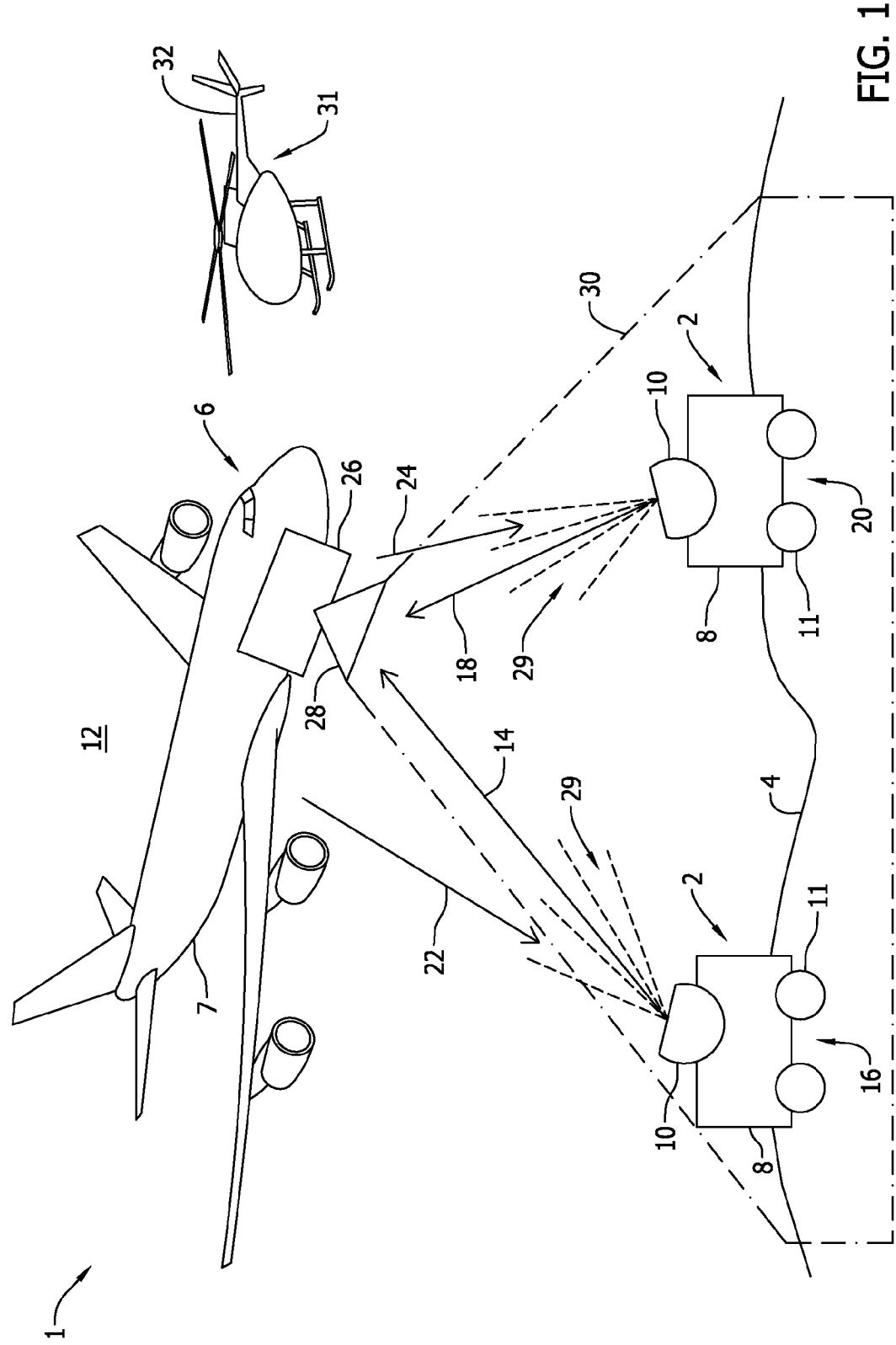
FIG. 1 is a schematic diagram of an exemplary physical environment having a mobile signal emitter residing on a two-dimensional ground surface surveilled by an aerial surveillance platform.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Also, as used herein, the terms "blind source separate", "blind source separated", and "blind source separation" refer to systems and methods employed for separating (e.g., filtering) one or more source signals of interest from a plurality of mixed signals. In applications including, without limitation, an underdetermined case (e.g., fewer observed signals than signal sources), blind source separation facilitates filtering pure signals of interest from an arbitrary set of time-varying signals (e.g., radar pulses from one or more signal emitters) without relying on substantial amounts of known information about the source signals or the signal mixing process.

Further, as used herein, the terms "denoise", "denoised", and "denoising" relate to devices, systems and methods employed to improve the quality of and pre-condition signals of interest received from a noisy environment. Denoising received signals of interest facilitates additional signal processing of the received signals of interest using additional devices, systems, and methods downstream from where signals of interest are initially received by a receiving device such as an antenna.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods for spatial filtering using data with widely different error magnitudes generated by wide area surveillance sensors described herein enable effective and efficient reception and classification of signals where spatial data having differing numbers of dimensions and widely varying error magnitudes. The embodiments described herein also facilitate separation of signal from noise and interference where the number of signals of interest is large and spatial content is a priority for classification. The embodiments described herein simplify processing required for cancellation of noise and interference in order to spatially match information between multiple sampling frames, including with spatial data derived from more than one sensor fused together. The systems and methods for spatial filtering using data with widely different error magnitudes generated by wide area surveillance sensors described herein also facilitate efficient locational matching where the spatial area surveilled by a wide area sensor is large and spatial data has different numbers of dimensions and widely varying error magnitudes using simpler processing architectures relative to known spatial filtering systems and methods. The embodiments described herein further provide enable improved detection range, processing and classification performance, and reduced power consumption in aerial surveillance operations without increasing computing resources beyond limitations on design constraints. The systems and methods for spatial filtering using data with widely different error magnitudes generated by wide area surveillance sensors described herein also facilitate efficient and effective high performance post-processing of spatial data obtained from wide area sensors surveilling large spatial areas. The embodiments described herein also enable statistically joining together over time spatial data-containing vectors derived from wide area sensors and having differing numbers of dimensions and widely varying error magnitudes. The embodiments described herein further facilitate discerning between stationary and moving signal emitters with an acceptable error using spatial data obtained from wide area sensors.

FIG. 1 is a schematic diagram of an exemplary physical environment 1 having at least one mobile signal emitter 2 residing on a two-dimensional ground surface 4 surveilled by an aerial surveillance platform 6 including, without limitation, an aircraft 7. In an exemplary embodiment, mobile signal emitter 2 is embodied in a ground-based signal emitter 8 having wheels 11. In other embodiments, not shown, a plurality of ground-based signal emitters 8 are present on ground surface 4. Ground-based signal emitter 8 includes a transceiver 10 configured to transmit an electromagnetic-based signal (e.g., a radar signal including, without limitation, a pulsed radar signal) into a three-dimensional space including, without limitation, a sky 12. Transceiver 10 is also configured to detect aerial surveillance platform 6 through a reflection of at least one signal including, without limitation, a first signal 14 transmitted into sky 12 at a first time from a first location 16 and a second signal 18 transmitted into sky 12 at a second time from a second location 20. Characteristics of aerial surveillance platform 6 detectable by ground-based signal emitter 8 include, without limitation, spatial information of aerial surveillance platform 6 in sky 12 discerned from a first reflected signal 22 of first signal 14 and a second reflected signal 24 of second signal 18. Spatial information includes, without limitation, a distance (e.g., range) of aerial surveillance platform 6 from transceiver 10, an azimuth from transceiver 10, an elevation relative to transceiver 10, and a velocity of aerial surveillance platform 6.

Also, in an exemplary embodiment, aerial surveillance platform 6 includes a signal processing platform 26 including an antenna 28. Antenna 28 is configured to receive a plurality of signals 29 including first signal 14 and second signal 18. Antenna 28 is also configured to transmit at least one of first signal 14 and second signal 18 to signal processing platform 26. Antenna 28 and signal processing platform 26 include analog and digital electronic circuit components (not shown) configured to at least one of detect, process, quantify, store, and display various characteristics of a plurality of signals 29 including, without limitation, a frequency, a time of arrival, a time of departure, a pulse width, a pulse amplitude, a pulse repetition interval, and an angle of arrival (AOA). Signal processing platform 26 also includes an analog-to-digital converter configured to generate at least one signal parameter vector from each signal 29 of the plurality of signals 29. Signal parameter vector contains at least one characteristic of the aforementioned characteristics as digital data (e.g., at least one signal data block, also referred to herein as "coordinate") to be processed using a computer-based method on electronic hardware running software executed from a non-transient computer-readable storage media (e.g., memory).

In operation, in an exemplary embodiment, signal processing platform 26 provides spatial and identification information about ground-based signal emitter 8 located on ground surface 4 in a surveillable area 30 of antenna 28. In other embodiments, not shown, surveillable area 30 is a surveillable area located under the surface of a body of water. Signal processing methods implemented by signal processing platform 26, including computer-based methods, generate data in substantially real-time, facilitating substantially real-time determinations of characteristics of ground-based signal emitter 8. Characteristics of ground-based signal emitter 8 determined by signal processing methods implemented by signal processing platform 26 include, without limitation, an authorization of ground-based signal emitter 8 to operate in the surveillable area 30, whether ground-based signal emitter 8 is moving or stationary, and a level of threat (e.g., identification, friend or foe—IFF) that ground-based signal emitter 8 poses to at least one of aerial surveillance platform 6, other ground-based signal emitters 8 in the surveillable area 30, and any other persons and property (e.g., an system or device 31 associated with a user of signal processing platform 26 including, without limitation, a patrol helicopter 32) in at least one of the surveillable area 30 and the sky 12.

Also, in operation in an exemplary embodiment, characteristics of ground-based signal emitter 8 determined by signal processing methods implemented by signal processing platform 26 also cause a variety of substantially real-time physical actions in physical devices and systems in at least one of electrical communication and data communication with signal processing platform 26. For example, characteristics of ground-based signal emitter 8 determined by signal processing methods implemented by signal processing platform 26 are displayed on at least one of a human machine interface (HMI) and a display, including, without limitation, as a map having a grid representative of a two-dimensional physical spatial domain including the surveillable area 30, where identities and at least one of present, past, and anticipated locations of ground-based signal emitter 8 are plotted substantially in real-time at their respective grid coordinates. Also, for example, characteristics of ground-based signal emitter 8 determined by signal processing methods implemented by signal processing platform 26 are transmitted in substantially real-time as data to actuator controllers in aerial surveillance platform 6 (e.g., rudders and flaps of aircraft 7) to facilitate evasive maneuvers thereof (e.g., by an autopilot function of aircraft 7, including where aircraft 7 is an unmanned autonomous vehicle (UAV)) to avoid an area of operation of ground-based signal emitter 8 determined to be a threat.

As a further example, characteristics of ground-based signal emitter 8 determined by signal processing methods implemented by signal processing platform 26 are transmitted in substantially real-time as data as a warning signal to ground-based signal emitter 8 operating in the surveillable area 30 without authorization. In addition to the warning signal, characteristics of ground-based signal emitter 8 determined by signal processing methods implemented by signal processing platform 26 are transmitted in substantially real-time as data as an alert signal to an associated mobile system (e.g., patrol helicopter 32) operating in the vicinity of a particular unauthorized and/or threatening ground-based signal emitter 8. For example, alert signal is transmitted to at least one of a police and military unit, including at least one of a robotic and an autonomous unit (e.g., UAV) having actuator controllers configured to receive the data and actuate directed movement toward the unauthorized and/or threatening ground-based signal emitter 8 (e.g., to neutralize a particular unauthorized and/or threatening ground-based signal emitter 8). Also, for example, characteristics of ground-based signal emitter 8 determined by signal processing methods implemented by signal processing platform 26 are transmitted in substantially real-time as data as a control signal to at least one of an electronic support measure (ESM) and an electronic warfare (EW) system positioned at least one of proximate antenna 28 and distal aerial surveillance platform 6 to direct, for example, a jamming signal (not shown) at ground-based signal emitter 8 operating in the surveillable area 30 without authorization.

Figure 2:
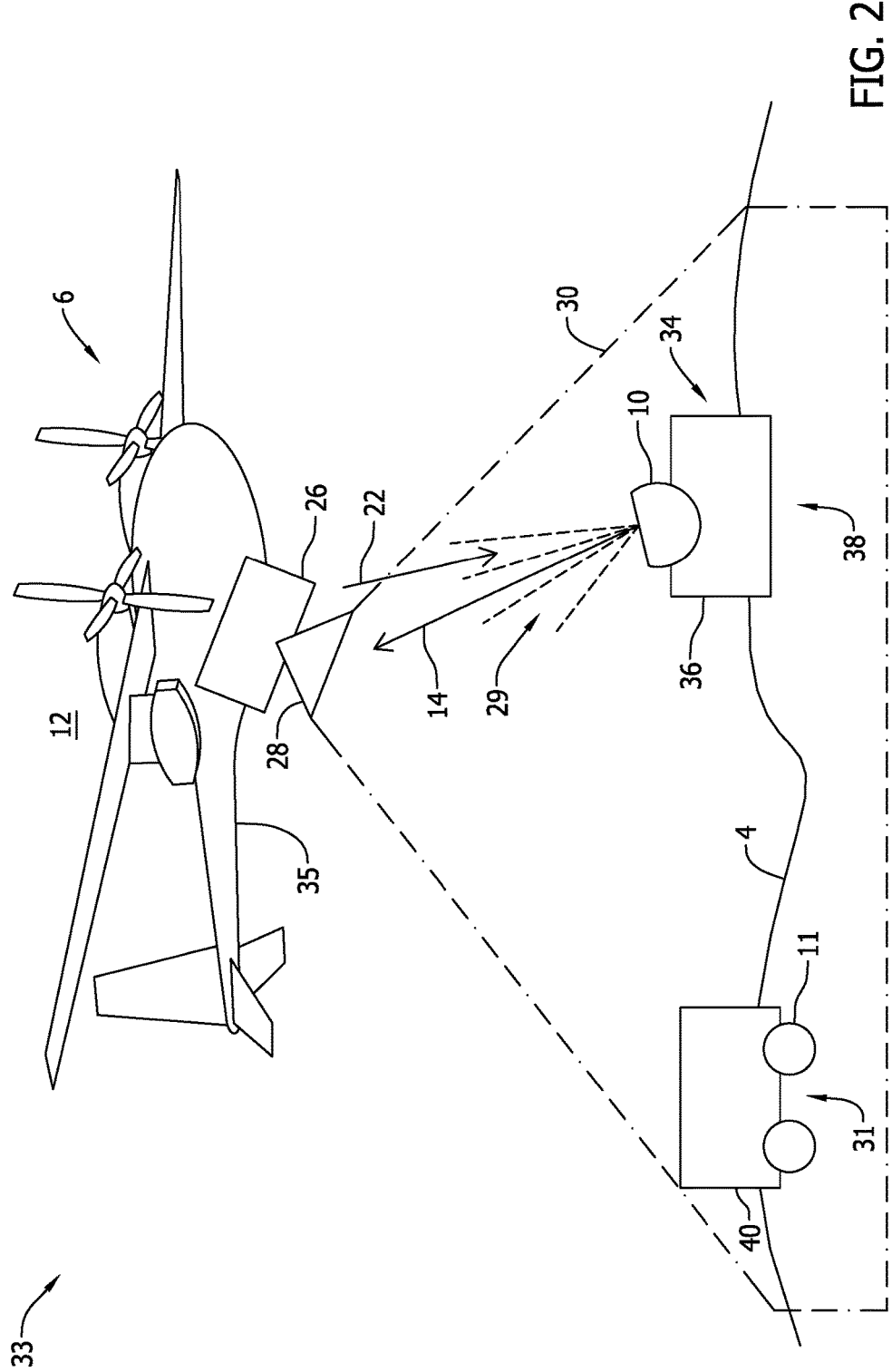
FIG. 2 is a schematic diagram of an alternative physical environment having a stationary signal emitter residing on the ground surface surveilled by the aerial surveillance platform shown in FIG. 1.

FIG. 2 is a schematic diagram of an alternative physical environment 33 having at least one stationary signal emitter 34 residing on ground surface 4 surveilled by aerial surveillance platform 6 including, without limitation, a UAV 35. In an alternative embodiment, stationary signal emitter 34 is embodied in a ground-based signal emitter 36. In other embodiments, not shown, a plurality of ground-based signal emitters 36 are present on ground surface 4. Ground-based signal emitter 36 includes transceiver 10 configured to transmit an electromagnetic-based signal (e.g., a radar signal including, without limitation, a pulsed radar signal) into three-dimensional space including, without limitation, sky 12. Transceiver 10 is also configured to detect aerial surveillance platform 6 through reflection of at least one signal over a plurality of time points. Characteristics of aerial surveillance platform 6 detectable by ground-based signal emitter 36 including, without limitation, spatial information of aerial surveillance platform 6 in sky 12 discerned from first reflected signal 22 of first signal 14 received by transceiver 10. Spatial information includes, without limitation, distance of aerial surveillance platform 6 from transceiver 10, azimuth from transceiver 10, elevation relative to transceiver 10, and velocity of aerial surveillance platform 6.

Also, in an alternative embodiment, aerial surveillance platform 6 includes a signal processing platform 26 including antenna 28. Antenna 28 is configured to receive the plurality of signals 29 and to transmit first signal 14 to signal processing platform 26. Antenna 28 and signal processing platform 26 include analog and digital electronic circuit components (not shown) configured to at least one of detect, process, quantify, store, and display various characteristics of the plurality of signals 29 including, without limitation, frequency, time of arrival, time of departure, pulse width, pulse amplitude, pulse repetition interval, and AOA. Signal processing platform 26 also includes an analog-to-digital converter configured to generate at least one signal parameter vector from each signal 29 of the plurality of signals 29. Signal parameter vector contains at least one characteristic of the aforementioned characteristics as digital data (e.g., at least one signal data block, also referred to herein as "coordinate") to be processed using a computer-based method on electronic hardware running software executed from a non-transient computer-readable storage media (e.g., memory).

In operation, in an exemplary embodiment, signal processing platform 26 provides spatial and identification information about ground-based signal emitter 36 located at a third location 38 on ground surface 4 in surveillable area 30 of antenna 28. Signal processing methods implemented by signal processing platform 26, including computer-based methods, generate further data in substantially real-time, facilitating substantially real-time determinations of characteristics of ground-based signal emitter 36. Characteristics of ground-based signal emitter 36 determined by signal processing methods implemented by signal processing platform 26 include, without limitation, an authorization of ground-based signal emitter 36 to operate in surveillable area 30, whether ground-based signal emitter 36 is moving or stationary, and a level of threat that ground-based signal emitter 36 poses to at least one of aerial surveillance platform 6, other ground-based signal emitters 36 in surveillable area 30, and any other persons and property (e.g., a system or device 31 associated with a user of signal processing platform 26 including, without limitation, a patrol vehicle 40 having wheels 11) in at least one of surveillable area 30 and sky 12.

Also, in operation in an exemplary embodiment, characteristics of ground-based signal emitter 36 determined by signal processing methods implemented by signal processing platform 26 also cause a variety of substantially real-time physical actions in physical devices and systems in at least one of electrical communication and data communication with signal processing platform 26. For example, characteristics of ground-based signal emitter 36 determined by signal processing methods implemented by signal processing platform 26 are displayed on at least one of an HMI and a display, including, without limitation, as a map having a grid representative of the two-dimensional physical spatial domain including the surveillable area 30, where identities and at least one of present, past, and anticipated locations of ground-based signal emitter 36 are plotted substantially in real-time at their respective grid coordinates. Also, for example, characteristics of ground-based signal emitter 36 determined by signal processing methods implemented by signal processing platform 26 are transmitted in substantially real-time as data to actuator controllers in aerial surveillance platform 6 (e.g., rudders and flaps of UAV 35) to facilitate evasive maneuvers thereof to avoid an area of operation of ground-based signal emitter 36 determined to be a threat.

As a further example, characteristics of ground-based signal emitter 36 determined by signal processing methods implemented by signal processing platform 26 are transmitted in substantially real-time as data as a warning signal to ground-based signal emitter 36 operating in surveillable area 30 without authorization. In addition to the warning signal, characteristics of ground-based signal emitter 36 determined by signal processing methods implemented by signal processing platform 26 are transmitted in substantially real-time as data as an alert signal to an associated mobile system (e.g., patrol vehicle 40) operating in the vicinity of a particular unauthorized and/or threatening ground-based signal emitter 36. For example, alert signal is transmitted to at least one of a police and military unit, including at least one of a robotic and an autonomous unit (e.g., UAV 35) having actuator controllers configured to receive the data and actuate directed movement toward the unauthorized and/or threatening ground-based signal emitter 36 (e.g., to neutralize a particular unauthorized and/or threatening ground-based signal emitter 36). Also, for example, characteristics of ground-based signal emitter 36 determined by signal processing methods implemented by signal processing platform 26 are transmitted in substantially real-time as data as a control signal to at least one of an ESM and an EW system positioned at least one of proximate antenna 28 and distal aerial surveillance platform 6 to direct, for example, a jamming signal (not shown) at ground-based signal emitter 36 operating in the surveillable area 30 without authorization.

Figure 3:
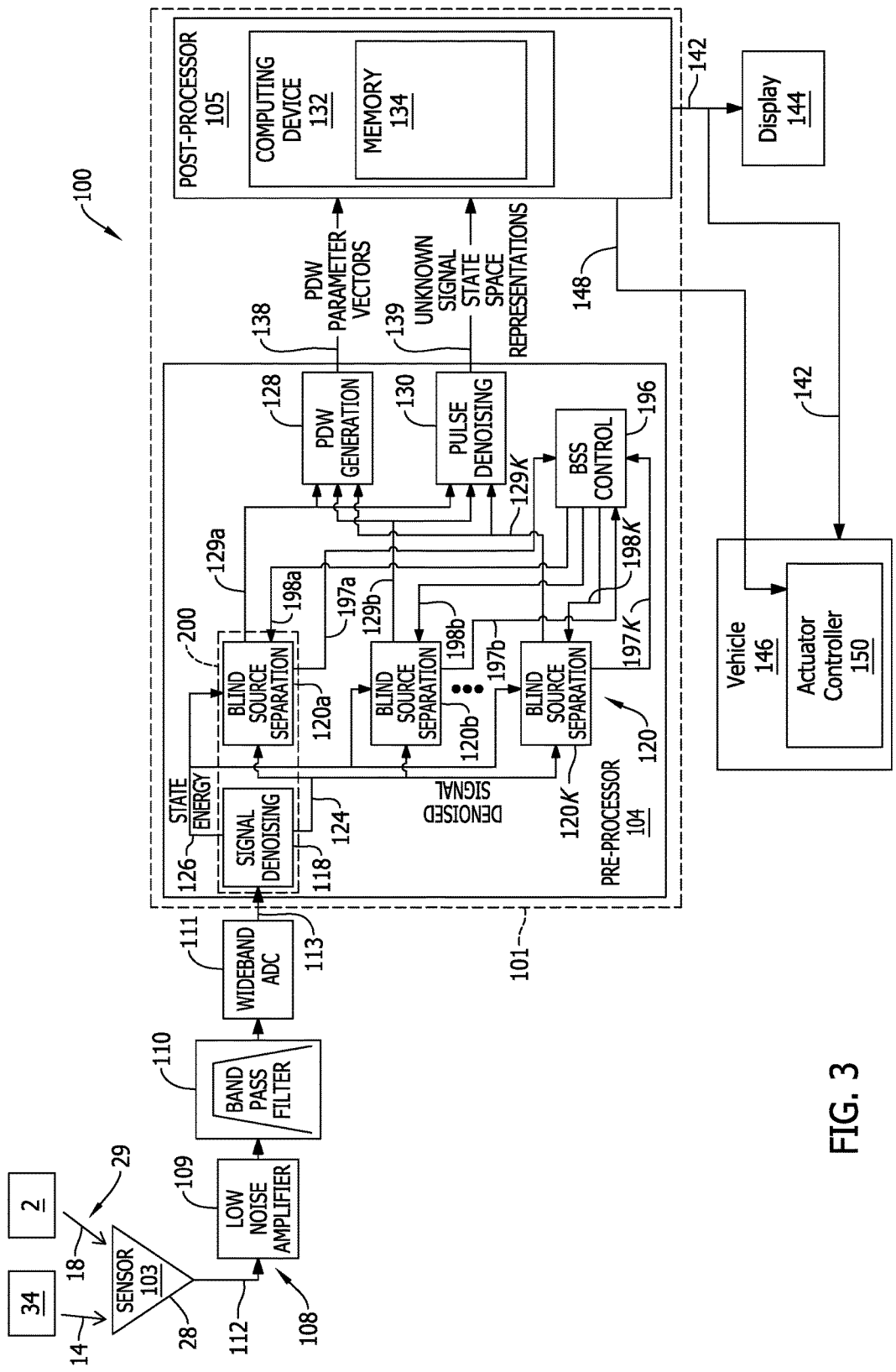
FIG. 3 is a schematic diagram of an exemplary signal processing system that may be used with the aerial surveillance platform shown in FIGS. 1 and 2.

FIG. 3 is a schematic diagram of an exemplary signal processing system 100 that may be used with aerial surveillance platform 6 shown in FIGS. 1 and 2. In an exemplary implementation, signal processing system 100 generates pulse descriptor word (PDW) vectors 138 using blind source separation (BSS) of received signals derived from, for example, and without limitation, radar signals. More generally, in other implementations, signal processing system 100 enables generating signal parameter vectors (e.g., a signal parameter vector 138) other than PDW vectors in a substantially similar manner as described herein. Also known as blind signal separation, BSS is used to separate (e.g., filter) one or more source signals of interest from a plurality of mixed signals. In applications including, without limitation, an underdetermined case (e.g., fewer observed signals than signal sources), BSS facilitates separating and identifying pure signals of interest from an arbitrary set of time-varying signals (e.g., radar pulses from one or more signal emitters) without relying on substantial amounts of known information about the signal emitters, signals of interest, or the signal mixing process.

In the exemplary embodiment, signal processing system 100 includes a signal data processor 101 communicatively coupled to antenna 28. Antenna 28, in the exemplary embodiment, is a wide-area sensor 103. Signal data processor 101 includes a pre-processor 104 and a post-processor 105. Sensor 103 is configured to receive signals from, for example, and without limitation, mobile signal emitter 2 and stationary signal emitter 34. Although two signal emitters 2 and 34 are shown in FIG. 3, those of skill in the art will appreciate that sensor 103 may receive signals from any number of signal emitters from surveillable area 30 (shown in FIGS. 1 and 2).

Sensor 103 is communicatively coupled to pre-processor 104 through a pre-conditioner 108. In the exemplary embodiment, pre-conditioner 108 includes a low noise amplifier 109, a band pass filter 110, and a wideband analog-to-digital converter (ADC) 111. In operation, pre-conditioner 108 is configured to convert a sensor output signal 112 received from sensor 103 into an incoming signal 113 transmitted to pre-processor 104. Each incoming signal 113 is derived from a time-varying signal received at sensor 103. Time-varying signal may include a mix of signals received from signal emitters 2 and 34. For example, time-varying signals may include first signal 14 and second signal 18.

In the exemplary embodiment, pre-processor 104 includes one or more signal denoising modules 118, and a plurality of blind source separation (BSS) modules 120. Each BSS module 120 is coupled to a single signal denoising module 118, and represents one BSS channel 200. A total number of BSS channels 200 in signal processing system 100 is expressed as K. Signal denoising module 118 transmits a denoised signal 124 and a state energy signal 126 to each respective BSS module 120 (e.g., 120$a$, 120$b$, ..., 120K) of the plurality of BSS modules 120. State energy signal 126 represents a quantity (e.g., an analog voltage level) that is proportional to an amplitude of incoming signal 113 at particular sampled time points (e.g., states).

In operation, incoming signal 113 is transmitted from pre-conditioner 108 to signal denoising module 118 where incoming signal 113 undergoes signal denoising and is subsequently transmitted as denoised signal 124 to the each BSS module 120. For example, first signal 14 is initially received at sensor 103 as a pulse having signal characteristics including, without limitation, a frequency and a bandwidth. In this example, a single pulse of first signal 14, after processing by pre-conditioner 108, is then received at signal denoising module 118 as a mixed signal (e.g., the incoming signal 113 represents a signal pulse of the first signal 14 and has various characteristics including, without limitation, noise and information other than the desired information of interest). Signal denoising module 118 denoises the mixed incoming signal 113 prior to transmitting denoised signal 124 having a frequency and a bandwidth (or a regular pattern of frequencies and bandwidths) to the BSS modules 120.

Methods implemented by signal processing system 100 are performed in substantially real-time by the devices and systems described above.

Further, in the exemplary embodiment, pre-processor 104 includes one or more PDW generation modules 128 coupled to each BSS module 120, and a pulse denoising module 130 coupled to each BSS module 120. PDW generation module 128 generates PDW parameter vector 138 based on blind source separated signals 129 received from each BSS module 120. Each PDW parameter vector 138 contains data representative of characteristics of interest of one of signals 14 and 18 derived from a singular pulse of blind source separated signal 129 (e.g., frequency, bandwidth, time of arrival, time of departure, pulse width, pulse amplitude, pulse repetition interval, and/or AOA). Pulse denoising module 130 also generates an unknown signal state space representation signal 139 based on blind source separated signals 129. Unknown signal state space representation signal 139 contains data representative of additional (e.g., non-PDW-type) characteristics of interest of one of signals 14 and 18 from which usable spatial information about one of signal emitters 2 and 34 is discernable. PDW parameter vectors 138 and unknown signal state space representation signals 139 are transmitted to post-processor 105. Signal denoising module 118, PDW generation module 128, and pulse denoising module 130 include suitable signal filtering, signal amplification, signal modulation, signal separation, signal conditioning, and/or ADC circuitry implemented using analog and/or digital electronic circuit components. Also, in the exemplary embodiment, each BSS module 120 transmits a respective blind source separated signal 129 (e.g., 129$a$, 129$b$, ..., 129K) to PDW generation module 128 and to pulse denoising module 130.

Post-processor 105 includes a computing device 132 that includes a memory 134. As described above, PDW generation module 128 receives blind source separated signals 129 from each respective BSS module 120. PDW generation module 128 then utilizes the blind source separated signals 129 to generate a PDW parameter vector 138, which is subsequently transmitted to post-processor 105. PDW parameter vector 138 is received by computing device 132 and stored as non-transient computer-readable data in memory 134 including, without limitation, as at least one buffered data set. Pulse denoising module 130 is also configured to receive blind source separated signals 129 from each respective BSS module 120. Pulse denoising module 130 is further configured to utilize the blind source separated signals 129 to generate the unknown signal state space representation signal 139, which is subsequently transmitted to post-processor 105. Unknown signal state space representation signal 139 is received by computing device 132 and stored as non-transient computer-readable data in memory 134 including, without limitation, as at least one buffered data set. In the exemplary embodiment, computing device 132 fetches buffered data sets from memory 134 for processing using a computer-based method employing an operating system running software executed from instruction set data also stored in a non-transient memory 134 (e.g., from one or more non-transient computer-readable storage media).

Computing device 132 implements a computer-based method (e.g., from software instructions stored in memory 134) to carry out operations based on data contained in at least one of PDW parameter vector 138 and unknown signal state space representation signal 139. Such operations include, without limitation, detecting, processing, quantifying, storing, and displaying (e.g., in human readable data form) various characteristics of at least one signal (e.g., signals 18 and 20) represented as data in at least one of PDW parameter vector 138 and unknown signal state space representation signal 139. For example, PDW parameter vector 138 generated by PDW generation module 128 contains a plurality of PDW vector data blocks structured in a vector form, where each PDW vector data block contains one parameter of first signal 14. Parameters (e.g., representative of at least one characteristic of first signal 14) include, without limitation, frequency, bandwidth, time of arrival, time of departure, pulse width, pulse amplitude, pulse repetition interval, and/or AOA. Computing device 132 reads PDW parameter vector 138 and carries out at least one of the aforementioned operations on at least one PDW vector data block of the plurality of PDW vector data blocks. Also, in the exemplary embodiment, computing device 132 reads and separates (e.g., deinterleaves) PDW parameter vector 138 into its constituent PDW vector data blocks, and stores fewer PDW vector data blocks in memory 134 than the total number of PDW vector data blocks contained in PDW parameter vector 138. Deinterleaving of PDW parameter vector 138 enables determining characteristics of interest of signals 14 and/or 18 by computing device 132 to, for example, and without limitation, accurately determine and track spatial information for signal emitters 2 and/or 34. In other implementations, computing device 132 reads and separates all PDW vector data blocks from one another and stores all data contained therein in memory 134. Computing device 132 performs the aforementioned operations substantially simultaneously (e.g., in real-time) upon receipt of signals 14 and 18 by sensor 103.

Resultant data from operations performed by computing device 132 are stored in memory 134. Further, in the exemplary embodiment, computing device 132 causes post-processor 105 to transmit a data output signal 142 to an HMI to facilitate at least one of an interaction, a modification, a visualization, at least one further operation, and a viewable recording of information about signals 14 and 18 by a user of signal processing system 100. HMI is, for example, a display 144 which receives data output signal 142 from post-processor 105. In one example, characteristics (e.g., location characteristics such as grid coordinates in a physical spatial domain, e.g., two-dimensional ground surface 4) representing a physical location of signal emitters 2 and 34, as determined by signal processing system 100, are displayed on display 144, and are updated in substantially in real-time. Data output signal 142 is also transmitted from post-processor 105 to at least one device and/or system (e.g., a vehicle 146) associated with signal processing system 100. Further, computing device 132 enables post-processor 105 to transmit, in substantially real-time, an actuator control signal 148 to an actuator controller 150 included within vehicle 146 to facilitate controlling vehicle 146. For example, vehicle 146 may be a remotely and/or autonomously operated land vehicle and/or an unmanned aerial vehicle (e.g., UAV 35).

In one mode of operation, at least one of frequency and bandwidth information contained in respective PDW parameter vectors 138 is displayed on display 144 along with locations of respective signal emitters 2 and 34 to facilitate accurate tracking of locations and association with particular signal emitters 2 and 34. In cases where at least one signal emitter 2 and 34 is mobile, display 144 is automatically updated in substantially real-time to show the location information of at least one respective mobile signal emitter 2 and 34. Further, computing device 132 also determines at least one of a velocity, an acceleration, a trajectory, and a track (e.g., including present and prior locations) of the at least one respective mobile signal emitter 2 and 34. In another mode of operation, characteristics determined by signal data processor 101 also trigger a variety of substantially real-time physical actions in physical devices and systems in communication with signal processing system 100. For example, characteristics of signal emitters 2 and 34, including frequency and bandwidth determined by signal processing system 100, are transmitted in substantially real-time as data to actuator controller 150 in vehicle 146 (e.g., to control rudders and flaps of UAV 35). If signal emitters 2 and 34 are unauthorized (e.g., hostile, previously undetected, etc.) signal emitters determined to be a threat, actuator controller 150 maneuvers vehicle 146 to avoid an area of operation of signal emitters 2 and 34 or engages signal emitters 2 and 34. As a further example, characteristics of signal emitters 2 and 34 determined by signal data processing methods described herein are transmitted in substantially real-time in a control signal to at least one of an ESM device and an EW system associated with signal processing system 100 to direct, for example, a jamming signal at signal emitters 2 and 34 operating in the surveillable environment of sensor 103 without authorization.

In operation, each BSS module 120 of the plurality of BSS modules 120 in signal processing system 100 implements filtering methods with dynamic updating to enable generating high quality PDWs containing at least one of frequency, center frequency, bandwidth, pulse time, and pulse width information. Such improved accuracy and resolution of PDWs to track, for example, frequency and bandwidth of signals of interest facilitates identifying, determining, and/or analyzing signal emitters 2 and 34 from which associated signals are emitted. For example, information including, without limitation, information derived from PDWs from signal emitters 2 and 34 is displayed on display 144 after being transmitted thereto by post-processor 105 as data output signal 142, as described above. This improved information enables signal processing system 100 to distinguish signal emitter 2 from signal emitter 34. Also, for example, different signal emitters 2 and 34 in a surveilled environment of sensor 103 are plotted at respective locations (e.g., grid coordinates) on display 144 (e.g., as a map).

Also, in operation, the plurality of BSS modules 120 separate a plurality of denoised signals 124. Each BSS module 120 contains a plurality of tunable filters (not shown), where each filter operates based on filter parameters including, without limitation, a center frequency and a bandwidth. Further, in the exemplary embodiment, pre-processor 104 includes a BSS control module 196, which facilitates controlling each respective BSS module 120 of the plurality of BSS modules 120. BSS control module 196 receives respective BSS data signals 197 (e.g., 197a, 197b, . . . , 197K) containing BSS-related information including, without limitation, frequency, bandwidth, and state, from each BSS module 120 of the plurality of BSS modules 120. Based on the BSS-related information contained in BSS data signals 197, BSS control module 196 also generates and transmits respective BSS control signals 198 (e.g., 198a, 198b, . . . , 198K) back to each respective BSS module 120 to control, for example and without limitation, a timing of receipt of denoised signal 124 and transmission of respective blind source separated signals 129 to at least one of PDW generation module 128 and pulse denoising module 130. Information contained in BSS data signals 197 and BSS control signals 198 is used by BSS control module 196 to facilitate implementation of a feedback control loop.

Figure 4:
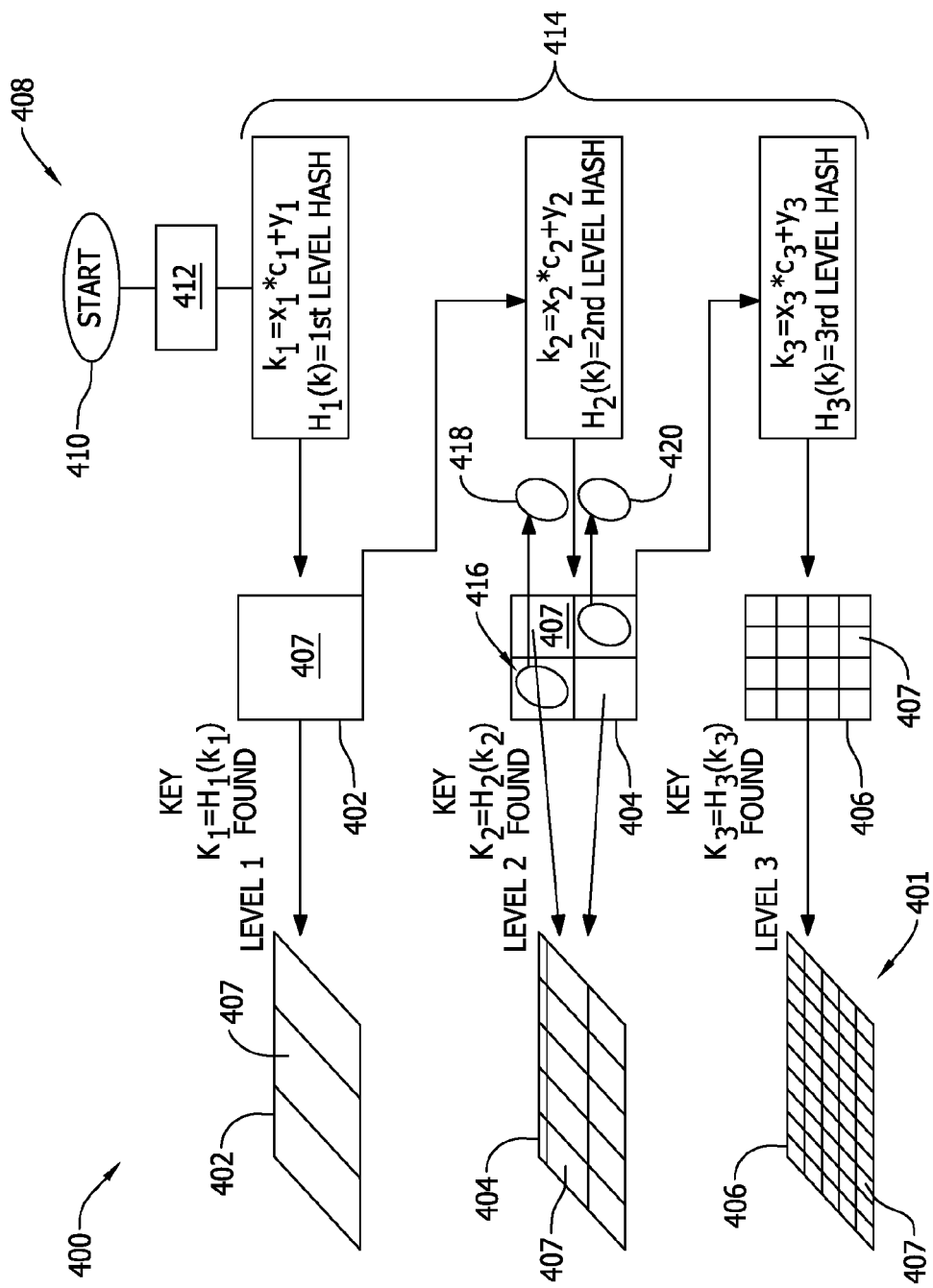
FIG. 4 is a schematic diagram of an exemplary process for deinterleaving signal parameter vector data that may be used with the signal processing system shown in FIG. 3.

FIG. 4 is a schematic diagram of an exemplary process 400 for deinterleaving signal parameter vector data that may be used with signal processing system 100 shown in FIG. 3. In an exemplary embodiment, at least one array data structure 401 is stored at at least one address in memory 134 (not shown). Array data structure 401 includes a plurality of arrays including a sparse (e.g., coarse) array (grid denoted "Level 1") 402, a medium array 404 ("Level 2"), and a fine array 406 ("Level 3"). Each array of the plurality of arrays includes a plurality of elements (e.g., grid coordinates) 407 which are subaddressed from the address of array data structure 401 in memory 134. Sparse array 402 contains a lesser number of elements 407 than medium array 404, and fine array 406 contains a greater number of elements 407 than medium 404. Further, elements 407 of sparse array 402, medium array 404, and fine array 406 represent successively finer representations of substantially equal sized subregions of a physical spatial domain (e.g., surveillable area 30). At any given time, a collection of elements 407 represents, at any point in time, an area of surveillable area 30. In the case of a mobile signal processing system 100 (not shown), the collection of elements 407 represents, over successive points (e.g., frames) in time, a varying, rather than substantially constant, area of surveillable area 30.

Also, in an exemplary embodiment, a shadow hash key routine 408 is stored as software instructions in memory 134 and is executed by computing device 132 (not shown) in a computer-based method. Shadow hash key routine 408 is run on computing device 132 upon a user-initiated start state 410 including, without limitation, at least one of powering on and waking up signal processing system 100. Start state 410 proceeds to a first subroutine 412 during which computing device 132 continually checks whether or not at least one of signal parameter vector 138 data and unknown signal state space representation signal 139 data is received by post-processor 105 from pre-processor 104. If at least one of signal parameter vector 138 data and unknown signal state space representation signal 139 data is not received by post-processor 105, shadow hash key routine 408 loops back and performs first subroutine 412 again. If, during first subroutine 412, computing device 132 determines that at least one of signal parameter vector 138 data and unknown signal state space representation signal 139 data is received by post-processor 105 from pre-processor 104, shadow hash key routine 408 proceeds to a second subroutine 414. During second subroutine 414, computing device 132, in conjunction with memory 134, executes software instructions to at least one of read (e.g., get), insert (e.g., write), and delete spatially-defined data obtained using sensor 103. Also, during second subroutine 414, computing device executes a first shadow hash key function defined as:

$$H_1(k) = \text{Level 1 hash} \quad \text{Equation (1)}$$

where $H_1(k)$ is a hash function for mapping keys to elements 407 in sparse array 402, and k is the subaddress of at least one spatially-defined data record in sparse array 402 (e.g., element 407 in sparse array 402 at which the at least one spatially-defined data record is stored in memory 134). Key k, therefore, corresponds to the subregion of the surveilled physical spatial domain at a given point in time. In the case of sparse array 402 representative of a two-dimensional surveillable area 30, key k is determined as follows:

$$k_1 = x_1 * c_1 + y_1 \quad \text{Equation (2)}$$

where $k_1$ is the key, $c_1$ is a constant (e.g., determined by computing device 132), and $x_1$ and $y_1$ define the index into sparse array 402 having the subaddress of the respective element 407 (e.g., corresponding to a latitude and a longitude in the physical spatial domain).

Further, in an exemplary embodiment, shadow hash key routine 408 is executed in conjunction with storing at least one of signal parameter vector 138 data and unknown signal state space representation signal 139 data in memory 134 at a respective element 407 in sparse array 402 corresponding to a subregion in the physical spatial domain. During second subroutine 414, computing device 132 checks whether or not a key $k_1$ is found by $H_1(k)$ hash function. If key $k_1$ is not found, computing device 132 executes a second shadow hash key function, $H_2(k)$=Level 2 hash, substantially similar to the first shadow hash key function, but performed on medium array 404 rather than sparse array 402. If key $k_1$ is found, computing device 132 determines whether or not the spatially-defined data of interest is present in sparse array 402. If the spatially-defined data of interest is not stored in sparse array 402, computing device 132 then determines whether a pointer to an address in medium array 404 is present and, if so, second subroutine 414 is directed there. In the event the spatially-defined data is not stored in medium array 404, but rather medium array 404 contains a pointer to an address in fine array 406, second subroutine 414 is similarly directed there. Second subroutine 414 continues in this manner until computing device 132 finds the desired data value or values of interest, or it is determined that the value or values are not stored in memory 134.

As further shown and described below with reference to FIGS. 5-12, with each successive signal received, vectorized, and deinterleaved by signal processing system 100 over time, a plurality of elements 407 of array data structure 401 will have stored in them a plurality of signal data blocks with associated spatially-defined data values. The associated spatially-defined data values are derived from, and represent spatial characteristics of at least one signal emitter 2 and/or 34 in the physical spatial environment surveillable area 30. Computing device 132 also executes shadow hash key routine 408 to generate an store in memory 134 at least one elliptical error region probability object 416 representative of spatial information having widely varying error magnitudes and stored in a plurality of elements 407 in more than one of sparse array 402, medium array 404, and fine array 406.

In an exemplary embodiment, process 400 includes a first elliptical error region probability object 418 and a second elliptical error region probability object 420. Shadow hash key routine 408 also facilitates combining spatial data values including, without limitation, non-sparse spatial objects, of varying sparseness amongst at least two of sparse array 402, medium array 404, and fine array 406 into at least one elliptical error region probability object 416 that is operable on by computing device 132 within a stochastic sparse tree grid including array data structure 401, for example as described in U.S. Pat. No. 8,805,858, titled "Methods and systems for spatial filtering using a stochastic sparse tree grid" and incorporated by reference herein in its entirety. Therefore, elliptical error region probability object 416 enables representation of spatial data initially acquired and further derived from at least one sensor 103 in a memory- and computationally-efficient representation using a single object. Further, in an exemplary embodiment, shadow hash key routine 408 thus provides an efficient lookup method using shadow hash keys, and it operates within array data structure 401 using individual elements 407 and elliptical error region probability object 416 to store, organize, select, and analyze spatial signal data of interest and to read, write, and delete that data in an operationally-, computationally-, and memory-efficient manner.

In the context of U.S. Pat. No. 8,805,858, supra, process 400 and shadow hash key routine 408 facilitate use of signal denoising module 118 and the at least one blind source separation module 120 (including, for example and without limitation, as subsystems of an "EW front-end" of signal processing system 100, not shown). Also, in other embodiments, not shown, process 400 and shadow hash key routine 408 facilitate sharing of spatial information between cooperating sensor 103-containing surveillance platforms (e.g., including one or more aerial surveillance platforms 6) configured to share their information, and employing widely varying types of sensors 103 types, sensors 103 requiring fusion of results, and/or any other sensor 103 front-end that produces sensor data with varying dimensions of and widely differing error magnitudes for sensor 103 output signals. The addition of process 400 and shadow hash key routine 408 to the methods and systems for spatial filtering using a stochastic sparse tree grid described in U.S. Pat. No. 8,805,858, supra, enables shadow hash keys to look up ellipsoidal regions in addition to typical grid elements 407 for the purpose of getting, inserting and deleting spatially-defined sensor information in stochastic tree grids.

In operation, in an exemplary embodiment, ellipsoidal regions including, without limitation, elliptical error region probability objects 416 are meant in a general sense and include intersections of ellipsoidal regions as well as angular regions defined by intersections of half plane regions, for example. A half plane can be considered a degenerate ellipse for algorithmic purposes and, therefore, ellipsoidal regions and their intersections refer to generalized ellipsoidal regions and their intersections. Widely different error magnitudes in the spatial information from at least one sensor 103 means these different regions are of both very large size and very small size, such that processing them together with standard grids (e.g., fine array 406, which is only efficiently processed with computing device 132 in cases of sparse spatial data within small areas or regions of surveilled physical spatial environment) requires new efficient methodologies. Process 400 and shadow hash key routine 408 enables this joint processing to be done efficiently and accurately based on a gridding methodology that can include objects such as ellipsoids and half spaces of up to M dimensions, where M is the number of vector input parameters present in signal parameter vector 138 (for example), or of two dimensions in the case of typical electro-optic/infrared-type sensors 103, or of three dimensions in the case of certain Laser/Light Detection and Ranging (LADAR/LIDAR)-based surveillance platform systems.

Sensor fusion involving communicatively cooperating multiple types of sensors 103, in an exemplary embodiment, includes a plurality of different possible processing dimensions. In general, however, the vector size of the input (e.g., signal parameter vector 138) for the tree grid used in process 400 is denoted below as M, assuming that the vector of inputs are considered as random variables and have associated standard deviations. In the context of U.S. Pat. No. 8,805,858, supra, when the tree grid of process 400 and shadow hash key routine 408 is used in this manner with implied or measured errors in an entire set of parameters, the regions can become so large as to be computationally- and memory-inefficient if implemented using sparse techniques described in U.S. Pat. No. 8,805,858, supra. To improve computational and memory use efficiency, process 400 and shadow hash key routine 408 facilitates useful operation on both the probability density function (PDF) support and the PDF on that support, as shown and described below with reference to FIG. 5.

Figure 5:
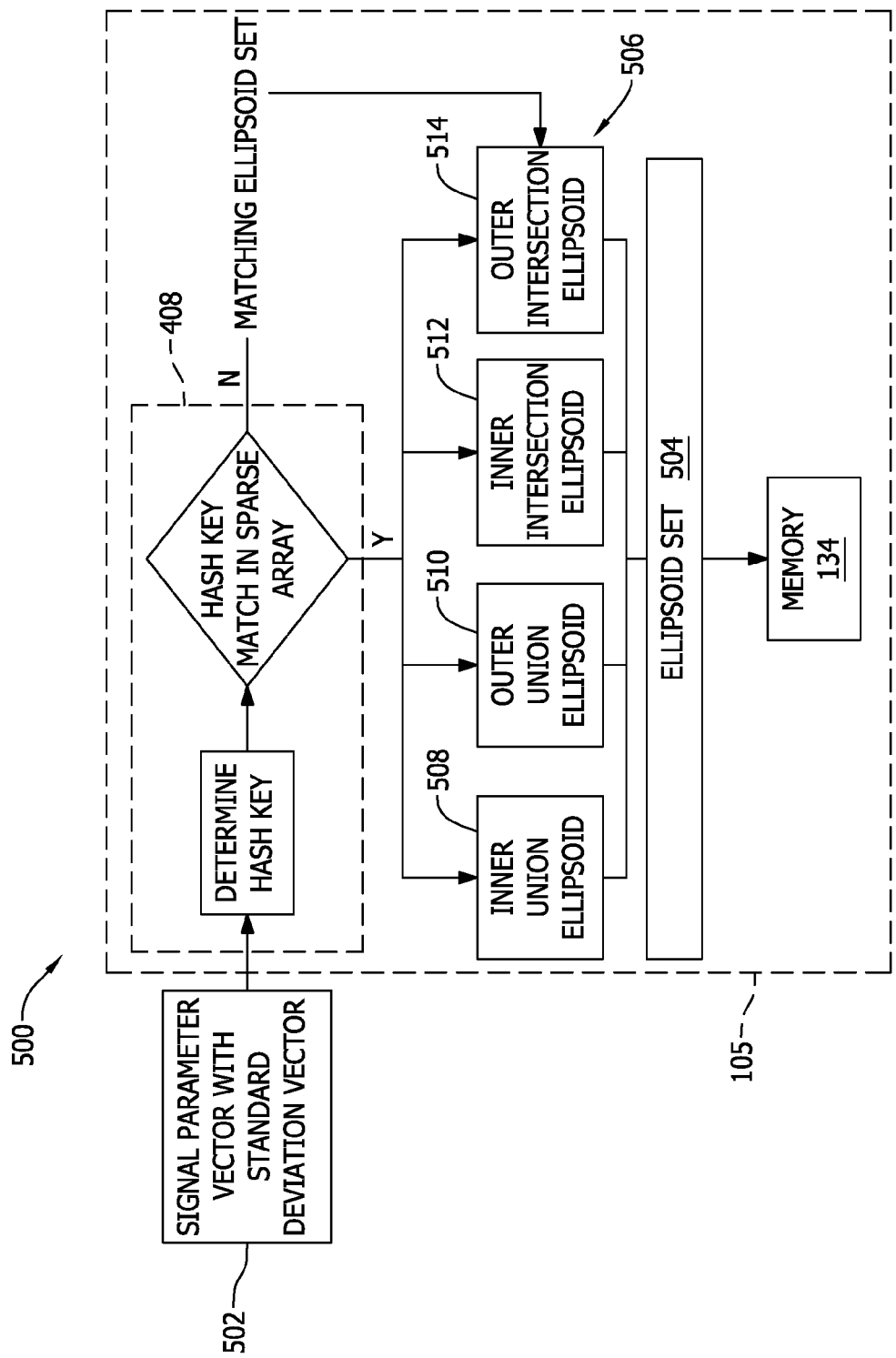
FIG. 5 is a schematic diagram of elliptical error region probability object operations that may be used with the process in FIG. 4.

FIG. 5 is a schematic diagram of elliptical error region probability object operations 500 that may be used with process 400 shown in FIG. 4. In an exemplary embodiment, elliptical error region probability object operations 500 are performed by computing device 132 from software instructions stored on and executed from memory 134. Elliptical error region probability object operations 500 are also performed concurrently and substantially simultaneously with process 400 and shadow hash key routine 408. Also, in an exemplary embodiment, signal parameter vector 138 is modified to include a standard deviation vector, resulting in a signal parameter vector with standard deviation vector signal 502. After deinterleaving of signal parameter vector with standard deviation vector signal 502, shadow hash key routine 408 is executed thereon by computing device 132 as shown and described above with reference to FIG. 4. If a hash key match is found in sparse array 402 of array data structure 401 (not shown), at least two signal data blocks representing spatial data of a first type about a particular signal emitter (e.g., at least one of mobile signal emitter 2 and stationary signal emitter 34, not shown) are used by computing device 132 to construct first ellipsoid error region probability object 418.

If hash key match is not found in sparse array 402, computing device 132 determines whether a pointer to an address in at least one of medium array 404 and fine array 406 is present and, if so, second subroutine 414 of shadow hash key routine 408 is directed there (as shown and described above with reference to FIG. 4. Likewise, if hash key matching is found in sparse array 402, but the match is for spatial data of a second type, at least two signal data blocks representing the spatial data of the second type are used by computing device 132 to construct second ellipsoid error region probability object 420. As further instances of signal parameter vector with standard deviation vector signals 502 are received and deinterleaved by post-processor 105, shadow hash key routine 408 further matches newly received signal data blocks to their respective associated elliptical error region probability objects (e.g., first elliptical error region probability object 418 for spatial data of the first type and second elliptical error region probability object for second type spatial data, where both the first 418 and the second 420 elliptical error region probability objects represent spatial errors associated with a particular signal emitter (e.g., 2 or 34) in the physical spatial domain under surveillance by at least one sensor 103). In those instances where matches are made in at least one of medium array 404 and fine array 406, as opposed to sparse array 402, pointers to those data values are used in elliptical error region probability object operations 500 where they are incorporated into at least one of first 418 and second 420 elliptical error region probability objects.

Also, in an exemplary embodiment, elliptical error region probability object operations 500, after computing device 132 determines first elliptical error region probability object 418 and second elliptical error region probability object 420, a resulting ellipsoid set 504 is stored in memory 134. Furthermore, computing device 132 determines a quantitative characterization of at least one of an intersection and a union of first elliptical error region probability object 418 and second elliptical error region probability object 420. In other embodiments, not shown, elliptical error region probability object operations 500 includes substantially similar determinations by computing device 132 on additional elliptical error region probability objects including, without limitation, a third elliptical error region probability object representing spatial error for a third spatial data type which can include non-standard spatial data derived from unknown signal state space representation signal 139. As further shown and described below with reference to FIGS. 6-12, computing device 132 is configured to determine at least four quantitative characterizations 506 of at least two elliptical error region probability objects 416: an inner union ellipsoid 508, an outer union ellipsoid 510, an inner intersection ellipsoid 512, and an outer intersection ellipsoid 514.

In operation, and with reference to U.S. Pat. No. 8,805, 858, supra, elliptical error region probability object operations 500 expand upon sparse tree grid processing where grids are of small size representing the smallest spatial error of at least one sensor 103 and most grid elements are empty, representing the sparsity of spatial signal information over the entire physical spatial environments of interest under surveillance. When sensor 103-derived information with large errors is added in the sparse tree grid, every grid cell contained in this large area must be added to. When processed by computing device 132 using the grid method, building of histogram data is based on summing PDFs representing location probabilities for a given piece of sensor 103-derived information. When all the grid cells are summed, however, this operation is no longer sparse and so is very computationally and memory inefficient. In combination, elliptical error region probability object operations 500, process 400, and shadow hash key routine 408 facilitates processing both the support shape of the PDF of spatial information and the PDF on that support. As further shown and described below with reference to FIGS. 6-12, this system and method enables building up spatial information through approximate intersections of PDF support and its corresponding PDF on that support set. This allows for efficiently processing PDF information in conjunction with an existing sparse stochastic tree grid (e.g., based on U.S. Pat. No. 8,805,858, supra) because the processing can use either this new method or the previous grid-based method, depending on which is more efficient. Thus, grid elements can work together with ellipsoidal regions to spatially filter elliptical error region probability objects 416 of interest.

Figure 6:
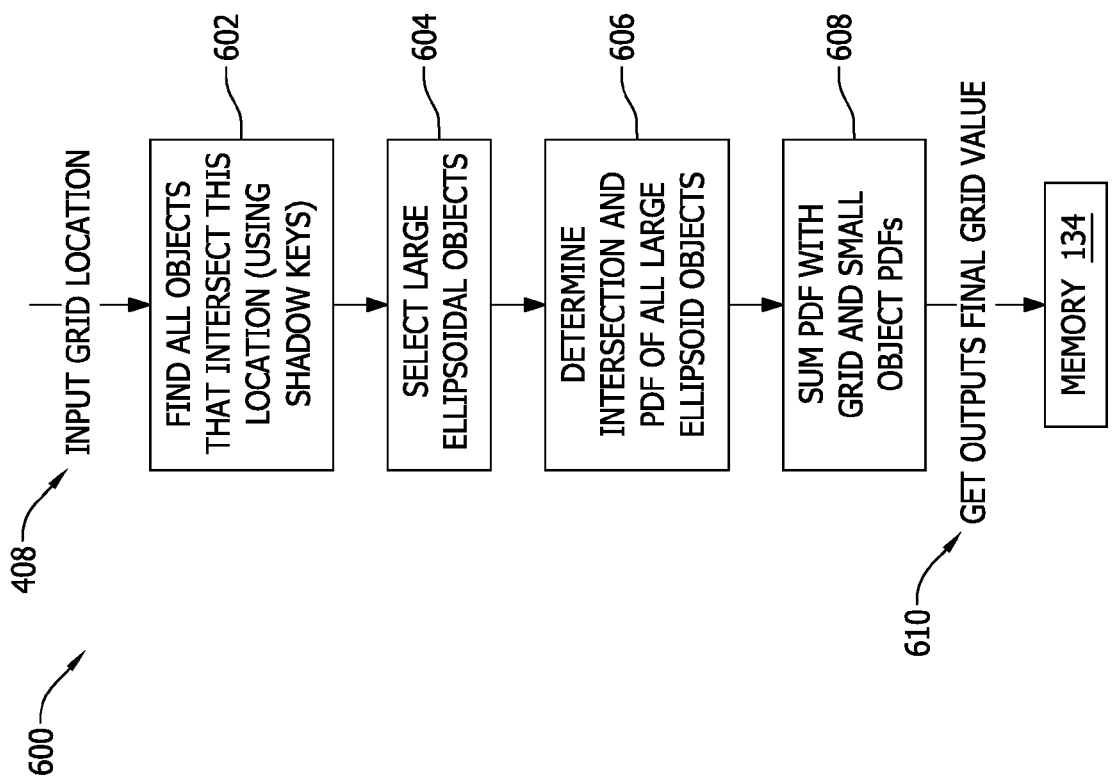
FIG. 6 is a flow chart of a filtering process that may be used with the signal processing system shown in FIG. 3.

FIG. 6 is a flow chart of a filtering process 600 that may be used with signal processing system 100 shown in FIG. 3. In an exemplary embodiment, shadow hash key routine 408 operating on elliptical error region probability objects 416 stored in association with elements 407 of sparse array 402 of array data structure 401 facilitates computing device 132 determining (e.g., finding), during a first step 602, all elliptical error region probability objects 416 that interest a particular element 407 of sparse array 402. Next, during a second step 604, computing device 132 selects large elliptical error region probability objects 416 (e.g., having error magnitudes greater than or equal to a predetermined threshold value). Where inner intersection ellipsoid 512 is the quantitative characterization desired to be performed by computing device 132 as part of elliptical error region probability object operations 500, during a third step 606, computing device 132 determines the intersection and PDF for first elliptical error region probability object 418 and second elliptical error region probability object 420 selected during second step 604.

Following determination of, for example and without limitation, inner intersection ellipsoid 512 during third step 606, computing devices 132 determines, during a fourth step 608, the sum of respective PDFs of first elliptical error region probability object 418, second elliptical error region probability object 420, along with elliptical error region probability objects 416 having error magnitudes less than the predetermined threshold value, if any, and other spatial data, if any (e.g., non-standard spatial data derived from unknown signal state space representation signal 139), present in respective elements 407 of array data structure 401. Thus, after fourth step 608, the resulting data construct stored in memory 134 contains spatial data associated with a particular signal emitter (e.g., at least one of mobile signal emitter 2 and stationary signal emitter 34) and having varying dimensions and error magnitudes. Finally, a get operation 610 step by computing device 132 outputs a final grid value (e.g., a subaddress in at least one of sparse array 402, medium array 404, and fine array 406 of array data structure 401 that is representative of a location of mobile signal emitter 2 or stationary signal emitter 34 in the physical spatial domain) along with an associated spatial error value attendant to the determined location, both of which are stored in memory 134.

In operation, the basic filtering process performed by computing device 132 includes determining when a new piece of sensor information (S) (e.g., a deinterleaved signal data block) received on signal parameter vector with standard deviation vector signal 502 has a large error (e.g., based on its standard deviation relative to signal data blocks of the same type). Computing device 132 then determines an approximated error region by an ellipsoid in dimension M. This is reasonable since most sensor 103-derived data is assumed to have a Gaussian error model. The error region is limited by a reasonable threshold such as 3-sigma (3σ) and so forms an ellipsoid E denoted as the support (E=supp(S)) of the current sensor 103 spatial information. This ellipsoid $E(\mu,Q)$ defined in $R^n$ with center q and shape matrix Q is the set:

$$E(\mu,Q)=\{x \in R^n | (x-\mu), Q^{-1}(x-\mu) \leq 1\} \qquad \text{Equation (3)}$$

which has an equivalent Gaussian PDF form:

$$E(\mu,Q)=\{x \in R^n | (x-\mu)^T Q^{-1}(x-\mu) \leq 1\} \qquad \text{Equation (Eqn.) (4)}$$

A half space (e.g., a half plane in two dimensions) can be treated as an unbounded ellipsoid, that is, as the ellipsoid with the shape matrix all but one of whose eigenvalues are infinity.

Also, in operation, ellipsoid $E(\mu,Q)$ is embodied in elliptical error region probability object 416 added to the stochastic tree grid (e.g., array data structure 401) using process 400, shadow hash key routine 408, and elliptical error region probability object operations 500 described above. The PDF associated with ellipsoid $E(\mu,Q)$ is defined as:

$$PDF_{\mu,Q}(x_1, \ldots, x_M) = PDF_{\mu,Q}(x) \qquad \text{Eqn. (5)}$$
$$= \frac{1}{\sqrt{(2\pi)^M |Q|}} \exp\left(-\frac{1}{2}(x-\mu)^T Q^{-1}(x-\mu)\right)$$

Thus, computing device 132 determines an information pair associated with a respective piece of sensor 103-derived information $\{E(\mu_1, Q_1), PDF_{\mu_2,Q_2}(\ )\}$. In this case, the two parameters mu (μ) and Q are the same. However, this is insufficient for capturing PDF information to intersect regions, so in general these pairs of information $\{E(\mu_1, Q_1), PDF_{\mu_2,Q_2}(\ )\}$ are stored in memory 134. This only requires 4M+2 numbers, and so is significantly more computationally- and memory efficient than known spatial data filtering systems and methods. For example, by operating at a 3σ level for sensor 103 data usage, the support of the trimmed normal or Gaussian PDF of an error directly corresponds to an ellipsoid. Hence, elliptical error region probability object 416 has a direct map to the PDF that has this ellipsoidal shape as its support.

Further, in operation, the intersection of two half planes represents a wedge that corresponds to a two dimensional angular area out to infinity. Thus, this can represent information from a sensor 103 configured to acquired only AOA information. Distance along the center line can parameterize a one dimensional (1D) Gaussian PDF with increasing width. By combining this with an intersection of a circle of a given radius (a special type of ellipse), an angular region is thus represented in memory 134 out to a maximum distance for sensors 103 with known maximum sensitivity or with regions of interest of maximum size. The intersection of four half planes with each pair orthogonal to the other pair, a representation of a rectangular region and distance along the center line can parameterize a two dimensional (2D) Gaussian PDF with axes given by the orthogonal pairs. Intersecting ellipsoids, half planes and both, along with replacing these intersections with the same general type of shapes prevents shapes from becoming ever more complex.

Furthermore, there are several methods implementable in an exemplary embodiment for determining intersections of ellipsoids. Generally, in M dimensional space, ellipsoidal approximations to the intersection area of first elliptical error region probability object 418 and second elliptical error region probability object 420. However, at least some known systems and methods require complex operations and are computationally- and memory inefficient. Further, such known systems and methods do not produce an approximation to the PDF support in the intersection region. For example, in known systems and methods, a PDF matched to the mean and covariance of the elliptical shape would greatly restrict how well this PDF matches the summed PDF in an intersection region. This means that separating the PDF(μ,σ) from the supp(PDF)(μ,σ) facilitates computing device 132 determining a better PDF match. Thus we use the notation:

$$PDF(\mu_p, \sigma_p) \quad \text{Equation (6)}$$

$$supp(PDF)(\mu_s, \sigma_s) \quad \text{Equation (7)}$$

This allows us to use a new method as shown and described below with reference to FIG. 7.

Figure 7:
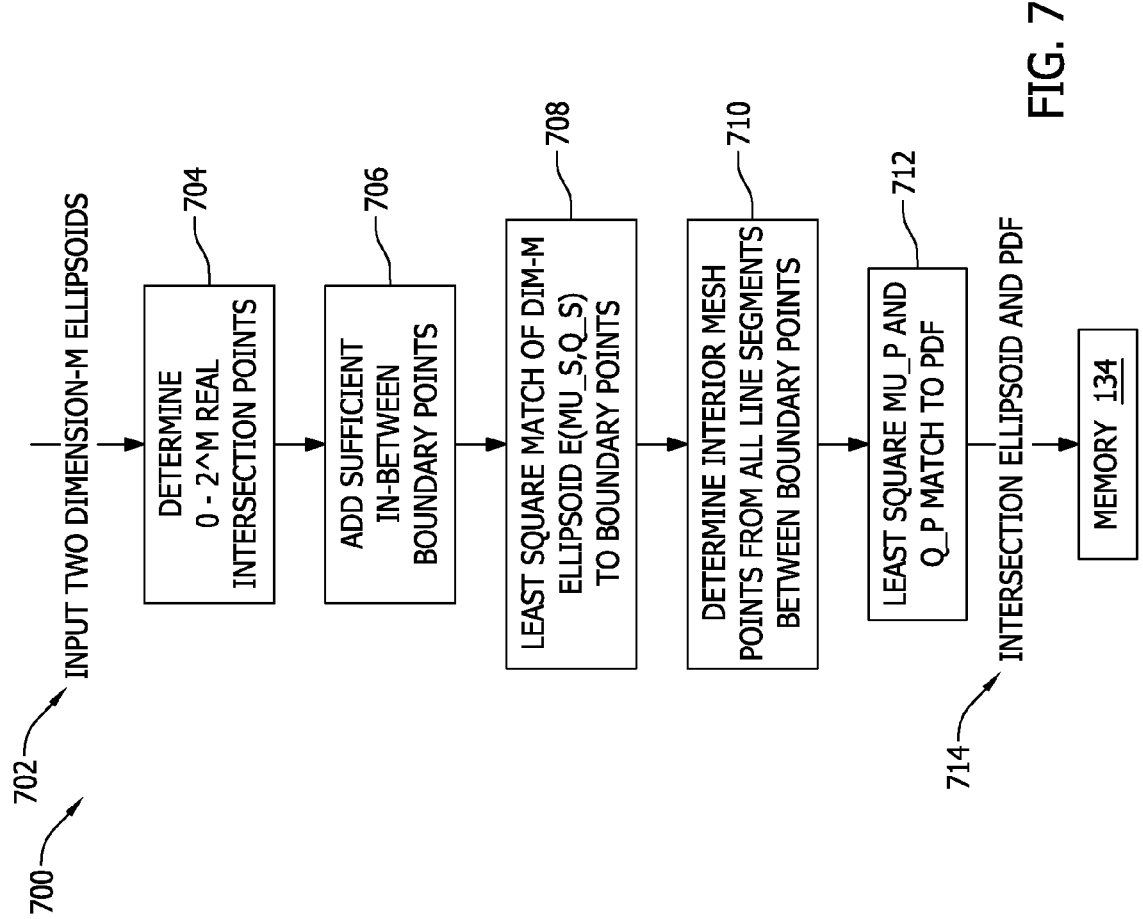
FIG. 7 is a flow chart of a probability density function (PDF) matching process that may be used with the signal processing system shown in FIG. 3.

FIG. 7 is a flow chart of a PDF matching process 700 that may be used with signal processing system 100 shown in FIG. 3. In an exemplary embodiment, at least two elliptical error region probability objects 416 (e.g., first elliptical error region probability object 418 and second elliptical error region probability object 420) are input into computing device 132 during a first operation 702. Next, during a second operation 704, computing device 132 determines $(0-2^M)$ real intersection points between first elliptical error region probability object 418 and second elliptical error region probability object 420. At least one after or substantially simultaneously with second operation 704, computing device 132 performs a third operation 706 to add a plurality of in-between boundary points to define a plurality of arc sections to a wedge defining the intersection region of first elliptical error region probability object 418 and second elliptical error region probability object 420. PDF matching process 700 then proceeds to a fourth operation 708 during which computing device 132 determines a least square match of dimension M ellipsoid $E(\mu_s, Q_s)$ to the plurality of boundary points determined during third operation 706.

PDF matching process 700 also includes a fifth operation 710, during which computing device 132 determines a plurality of interior mesh points defined as intersections of a plurality of line segments between at least one of the plurality of in-between boundary points (determined during third operation 706) and the $(0-2^M)$ real intersections points between first elliptical error region probability object 418 and second elliptical error region probability object 420 (determined during second operation 704). Having determined the $(0-2^M)$ real intersections points, the plurality of in-between boundary points, and the plurality of interior mesh points, PDF matching process 700 proceeds to a sixth operation 712 during which computing device 132 determines a least square $\mu_p$ and $Q_p$ match to PDF. Finally, during a seventh operation 714, computing device 132 determines, including, without limitation, in conjunction with filtering process 600 (shown and described above with reference to FIG. 6) the intersection ellipsoid and its PDF, both of which are stored in memory 134.

In operation, the least squares approximation carried out by PDF matching process 700 at point sets on the boundary of the intersection of first elliptical error region probability object 418 and second elliptical error region probability object 420, and the least squares approximations of the PDF at the interior mesh points formed from these boundary points involves fitting of the Gaussian PDF by computing device 132 determining Q and μ to minimize:

$$\min_{Q,\mu} \sum_i \left[ y_i - \frac{1}{\sqrt{(2\pi)^M |Q|}} \exp\left(-\frac{1}{2}(x_i - \mu)^T Q^{-1} (x_i - \mu)\right) \right]^2 \quad \text{Eqn. (8)}$$

where $\{(x_i, y_i)\}$ are the points and PDF values chosen in the interior mesh point generation during fifth operation 710. This is a non-linear minimization problem, which can be complex to implement and process for every intersection. By transforming this and taking logarithms, computing device 132 converts this into a standard least squares problem (as is used for the support shape estimate) as follows:

$$\min_{Q,\mu} \sum_i \left[ \log\left(y_i \sqrt{(2\pi)^M}\right) - \left(-\frac{1}{2}(x_i - \mu)^T Q^{-1}(x_i - \mu)\right) \right]^2 \quad \text{Eqn. (9)}$$

and then adjusting the final values to take into account |Q| in the final PDF. Note that a weighted least squares version will bring the solution closer to the solution of the original problem at only a marginal cost to computation and memory usage efficiency. The computational complexity of these least square methods are much simpler conceptually and are of complexity only about $(2M+1)^3$ (and, thus, significantly less than the aforementioned known systems and methods). Thus, when PDF matching process 700 and filtering process 600 are considered together in the context of sparse stochastic tree grid systems and methods (e.g., based on U.S. Pat. No. 8,805,858, supra), computing device 132 facilitates a comparison of the resources, time, and effort in doing an intersection to sum PDFs together against the same intersection using grids and use total operation count to determine which available method variation to use for doing a given get operation 610, as well as deciding the internal representation in the stochastic tree grid (e.g., array data structure 401).

Figure 8B:
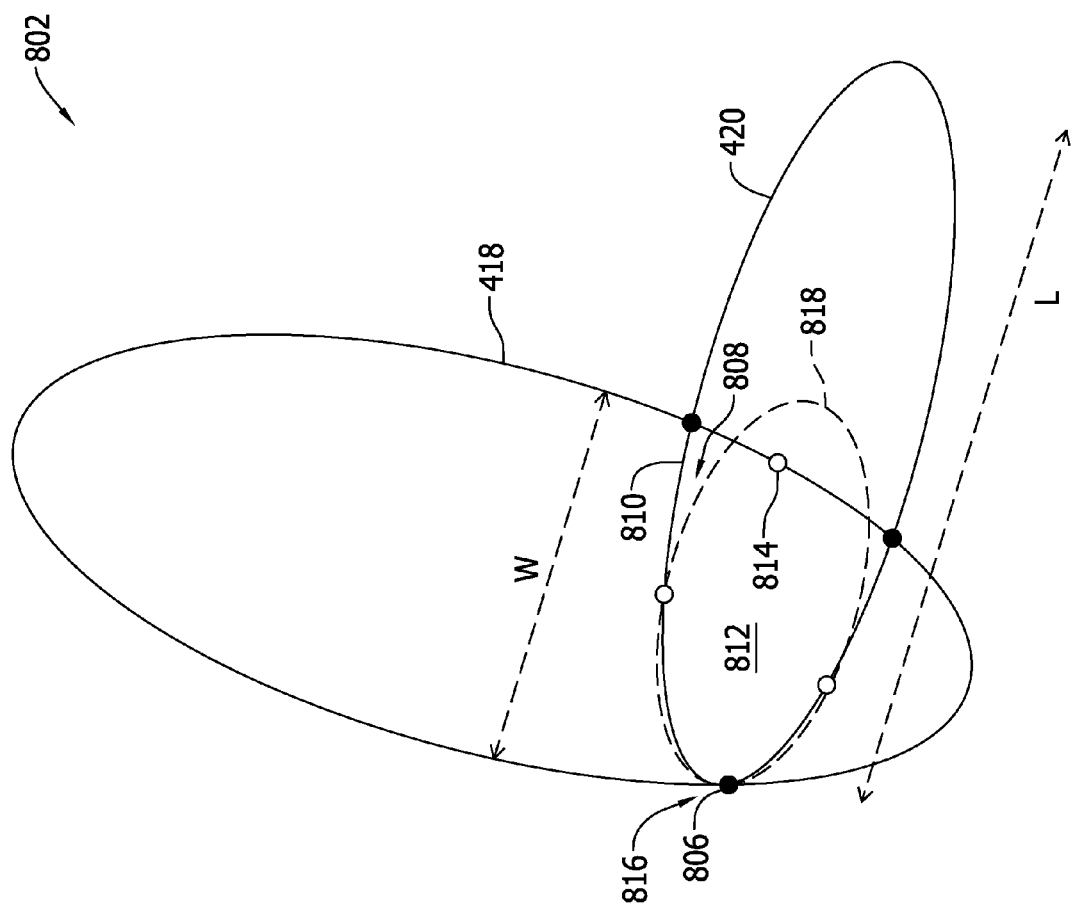
FIG. 8B is an exemplary plot of a three point ellipsoid intersection as determined by the signal processing system shown in FIG. 3.
Figure 8C:
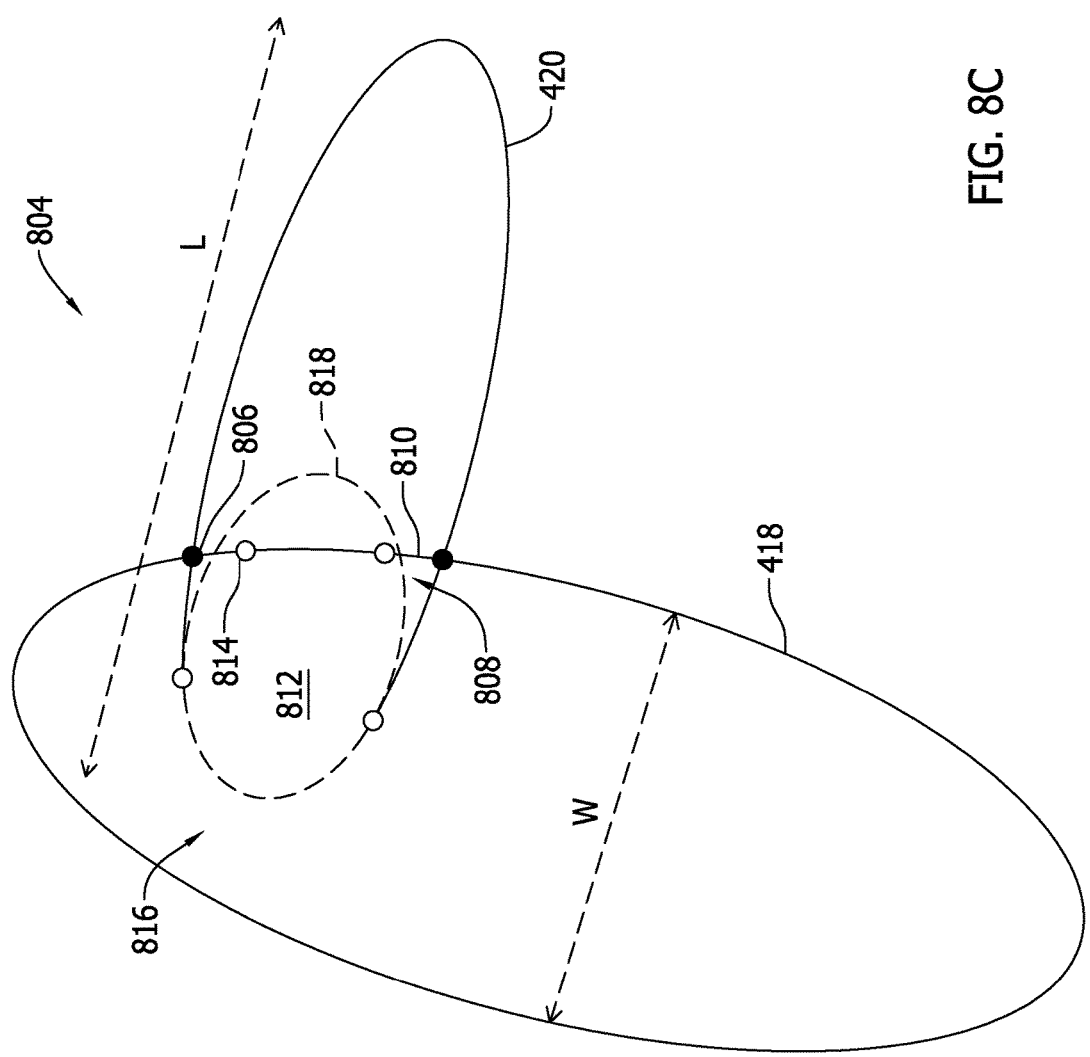
FIG. 8C is an exemplary plot of a two point ellipsoid intersection as determined by the signal processing system shown in FIG. 3.

FIG. 8A is an exemplary plot of a four point ellipsoid intersection 800 as determined by signal processing system 100 shown in FIG. 3. FIG. 8B is an exemplary plot of a three point ellipsoid intersection 802 as determined by signal processing system 100 shown in FIG. 3. FIG. 8C is an exemplary plot of a two point ellipsoid intersection 804 as determined by signal processing system 100 shown in FIG. 3. Referring to FIG. 8A, in an exemplary embodiment, four point ellipsoid intersection 800 includes four (e.g., $(0-2^M)$ =4) real intersection points 806 (denoted as solid dots) between first elliptical error region probability object 418 and second elliptical error region probability object 420. In this case, a length L (e.g., defined by a major axis) of second elliptical error region probability object 420 spans a width W (e.g., defined by a minor axis) of first elliptical error region probability object 418, thus resulting in computing device 132 determining four real intersection points 806. An intersection wedge 808 having four arc sections 810 having the four real intersection points 806 as their end points defines an area of an intersection region 812. Also, in an exemplary embodiment, four point ellipsoid intersection 800 includes four boundary points 814 (denoted as hollow dots) defined at substantially the midpoints of each arc section 810 of the four arc sections 810. As shown and described above with reference to FIG. 7, real intersection points 806 and boundary points 814 are determined by computing device 132 during PDF matching process 700.

Referring to FIG. 8B, in an exemplary embodiment, three point ellipsoid intersection 802 includes three (e.g., $(0-2^M)$ =3) real intersection points 806 between first elliptical error region probability object 418 and second elliptical error region probability object 420. In this case, length L of second elliptical error region probability object 420 does not fully span width W of first elliptical error region probability object 418. Rather, one end 816 of second elliptical error region probability object 420 is tangent to first elliptical error region probability object 418, thus resulting in computing device 132 determining three real intersection points 806. Intersection wedge 808 having three arc sections 810 has the three real intersection points 806 as their end points and defines area of intersection region 812. Also, in an exemplary embodiment, three point ellipsoid intersection 802 includes three boundary points 814 defined at substantially the midpoints of each arc section 810 of the three arc sections 810.

Referring to FIG. 8C, in an exemplary embodiment, two point ellipsoid intersection 804 includes two (e.g., $(0-2^M)$ =2) real intersection points 806 between first elliptical error region probability object 418 and second elliptical error region probability object 420. In this case, length L of second elliptical error region probability object 420 does not fully span width W of first elliptical error region probability object 418, and one end 816 of second elliptical error region probability object 420 resides inside of the bounds of first elliptical error region probability object 418, thus resulting in computing device 132 determining two real intersection points 806. Intersection wedge 808 having two arc sections 810 has the two real intersection points 806 as their end points and defines area of intersection region 812. Also, in an exemplary embodiment, two point ellipsoid intersection 804 includes four boundary points 814 defined not at midpoints of each arc section 810 of the three arc sections 810, but a points defining substantially one third the length thereof. In operation of an exemplary embodiment, in each case shown and described above with reference to FIGS. 8A, 8B, and 8C, computing device 132 approximates and fits an intersection ellipsoid 818 to at least one of real intersection points 806 and boundary points 814, as shown and described above with reference to FIG. 7 (e.g., during second 704, third 706, and fourth 708 operations of PDF matching process 700).

Figure 9:
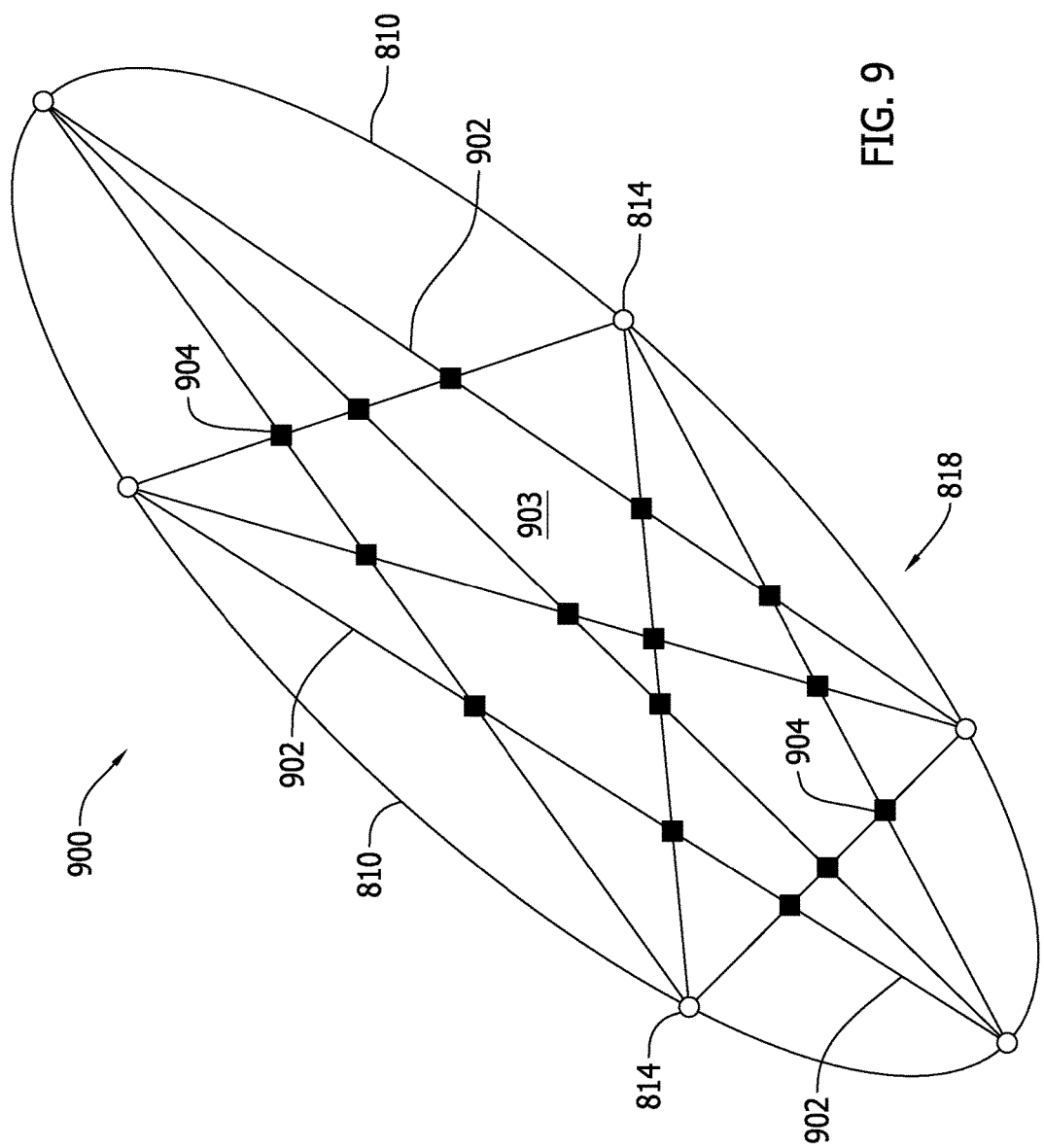
FIG. 9 is an exemplary plot of a plurality of interior mesh points as determined by the signal processing system shown in FIG. 3.

FIG. 9 is an exemplary plot 900 of a plurality of interior mesh points 904 as determined by signal processing system 100 shown in FIG. 3. In an exemplary embodiment, intersection ellipsoid 818 includes six boundary points 814 (denoted, as in FIGS. 8A, 8B, and 8C, as hollow dots) defining six arc sections 810, as determining by computing device 132, as shown and described above with reference to FIGS. 7, 8A, 8B, and 8C. Computing device 132 further determines a plurality of line segments 902 defined between the six boundary points 814 in all possible combinations except between adjacent boundary points 814. Thus, in an exemplary embodiment, each boundary point 814 of the plurality of boundary points 814 define first endpoints of three line segments 902. Each line segment 902 of those three line segments 902 extend to a second endpoint defined at a boundary point 814 at all other boundary points 814 other than boundary points 814 which are adjacent to the boundary point 814 defining the first endpoints of the three line segments 902. With six boundary points 814 in an exemplary embodiment, the result is a total of nine line segments 902 defined within an area 903 of intersection ellipsoid 818.

Also, in an exemplary embodiment, computing device 132 determines a plurality of intersection points between the nine line segments 902. As shown in FIG. 9, these intersection points define fifteen mesh points 904 (denoted as squares) from six boundary points 814 (e.g., $\binom{6}{6-4}$=15; "6 choose 6-4=15"). In other embodiments, not shown, real intersection points 806 are also used by computing device 132 in determining the plurality of mesh points 904. In operation, in an exemplary embodiment, PDF matching process 700 uses mesh points 904 for the least squares approximations of the PDF defined by intersection ellipsoid 818, as shown and described above with reference to FIG. 7.

Figure 10:
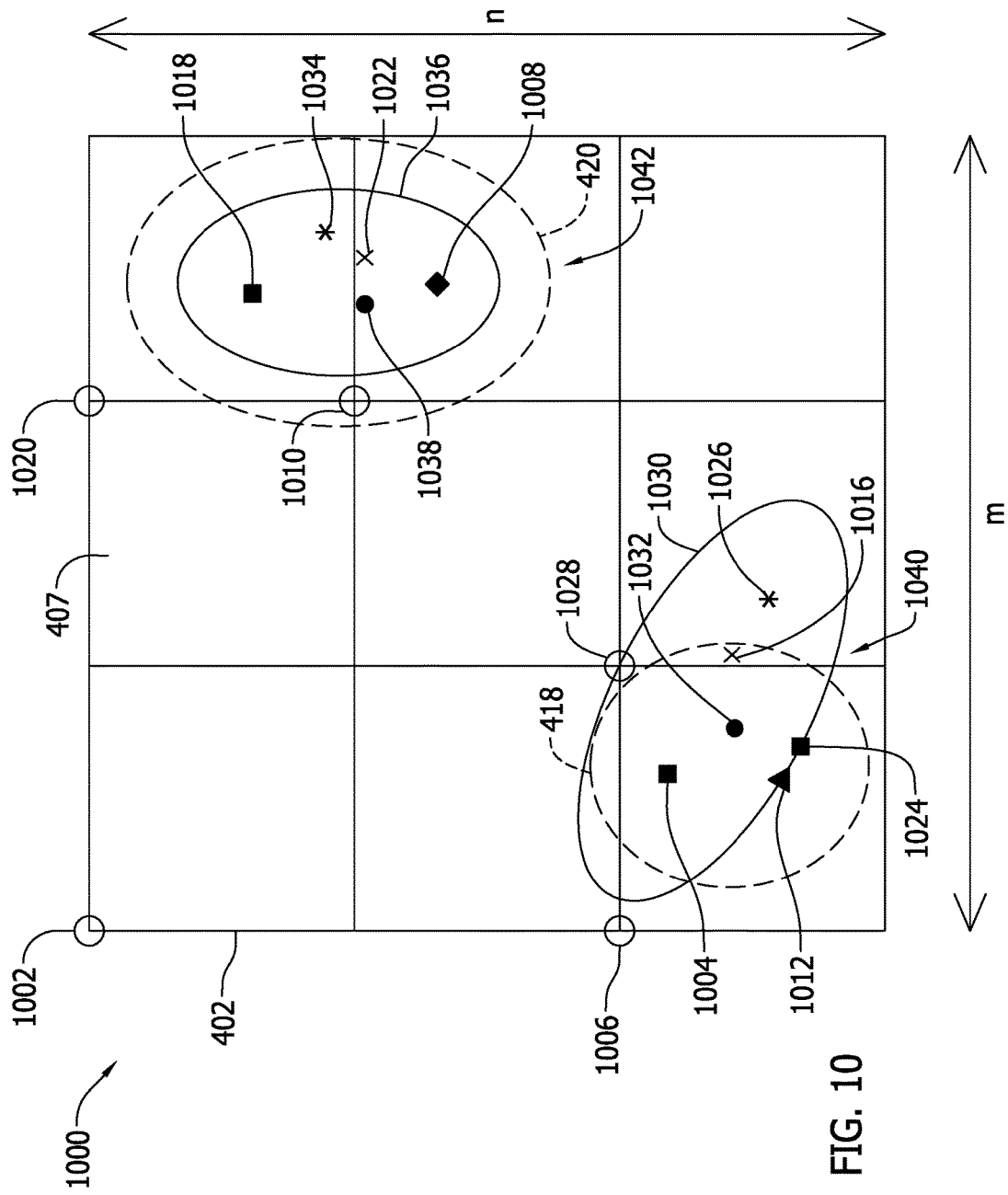
FIG. 10 is an exemplary plot of an elliptical error region probability based on a plurality of spatial type signal data blocks as determined by the signal processing system shown in FIG. 3.

FIG. 10 is an exemplary plot 1000 of an elliptical error region probability based on a plurality of spatial-type signal data blocks as determined by signal processing system 100 shown in FIG. 3. In an exemplary embodiment, sparse array 402 is embodied in a two dimensional a-by-b array with a=3 and b=3, and having nine elements 407 representative of subregions of surveillable area 30. In other embodiments, not shown, a does not equal b. In still other embodiments, not shown, sparse array 402 is embodied in a three-dimensional (e.g., cubic) array. Sparse array 402 includes an origin 1002 defined by an address in memory 134. A first signal data block 1004 (or, in some embodiments, a pointer thereto) of a first spatial type (e.g., a first coordinate, denoted by a solid square in FIG. 10) received at a first time point from a first signal emitter 34 (not shown) maps to a first subaddress 1006 in sparse array 402. Similarly, a second signal data block 1008 of a second spatial type (e.g., a second coordinate, denoted by a solid diamond in FIG. 10) received at a second time point from a second signal emitter 34 maps to a second subaddress 1010 in sparse array 402. Next, a third signal data block 1012 of a third spatial type (denoted by a solid triangle in FIG. 10) received at a third time point from first signal emitter 34 maps to the first subaddress 1006. With first subaddress 1006 containing two spatial-type signal data blocks, key $k_1 = H_1(k_1)$ is found by shadow hash key routine 408, and computing device 132 determines first elliptical error region probability object 418 of specific resolved addresses (e.g., locations in the physical spatial domain) of first signal data block 1004 with respect to third signal data block 1012. Determination of first elliptical error region probability 418 by computing device 132 includes determining a first center 1016 and a first pair of axes (not shown) of first elliptical error region probability object 418. First center 1016 is representative of an average value and a highest probability location of first signal emitter 34 in the physical spatial domain (e.g., surveillable area 30), and the first pair of axes is representative of the spatial error (e.g., standard deviation) of first center 1016 at the third time point. At least one of first elliptical error region probability object 418, first center 1016, first pair of axes, and spatial error (e.g., standard deviation) of first center 1016 are at least one of stored in memory 134 and displayed therefrom as human-readable data on display 144.

At a fourth point in time, a fourth signal data block 1018 of the first spatial type maps (denoted by a solid square in FIG. 10) to a third subaddress 1020. In an exemplary embodiment, computing device 132 modifies shadow hash key function $H_1(k)$ during shadow hash key routine 408 based on spatial data content contained in fourth signal data block 1018 as compared to second signal data block 1008 so that computing device 132 determines a second elliptical error region probability object 420 of specific resolved addresses (e.g., locations in the physical spatial domain) of second signal data block 1008 with respect to fourth signal data block 1018. Determination of second elliptical error region probability object 420 by computing device 132 includes determining a second center 1022 and a second pair of axes (not shown) of second elliptical error region probability object 420. Second center 1022 is representative of a highest probability location of second signal emitter 34 in the physical spatial domain, and the second pair of axes is representative of the spatial error (e.g., standard deviation) of second center 1022 at the fourth point in time. At least one of second elliptical error region probability object 420, second center 1022, second pair of axes, and spatial error of second center 1022 are at least one of stored in memory 134 and displayed therefrom as human-readable data on display 144.

At a fifth time point and a sixth time point, a fifth signal data block 1024 of the first spatial type (denoted by a solid square in FIG. 10) and a first spatial non-standard data point 1026 (denoted by an asterisk in FIG. 10), respectively, are received from first signal emitter 34. Fifth signal data block 1024 maps to first subaddress 1006 and first non-standard data point 1026, after being resolved to spatial data, maps to a fourth subaddress 1028. In an exemplary embodiment, computing device 132 modifies shadow hash key function $H_1(k)$ during shadow hash key routine 408 based on spatial data content contained in fifth signal data block 1024 and first non-standard data point 1026 as compared to first signal data block 1004 and third signal data block 1012 so that computing device 132 determines a refined (e.g., updated) first elliptical error region probability object 1030 of specific resolved addresses (e.g., locations in the physical spatial domain) of first signal data block 1004, third signal data block 1012, fifth signal data block 1024, and first non-standard data point 1026 with respect to one another. Determination of refined first elliptical error region probability object 1030 by computing device 132 includes determining a refined first center 1032 and a refined first pair of axes (not shown) of refined first elliptical error region probability object 1030. Refined first center 1032 is representative of an updated average value and an updated highest probability location of first signal emitter 34 in the physical spatial domain, and the refined first pair of axes is representative of an updated spatial error (e.g., standard deviation) of refined first center 1032 at the sixth time point. At least one of refined first elliptical error region probability object 1030, refined first center 1032, refined first pair of axes, and updated spatial error (e.g., standard deviation) of refined first center 1032 are at least one of stored in memory 134 and displayed therefrom as human-readable data on display 144.

At a seventh time point, a second non-standard data point 1034 (denoted by an asterisk in FIG. 10) of the same type as first non-standard data point 1026 is received from second signal emitter 34 and maps to third subaddress 1020 after being resolved to spatial data. In an exemplary embodiment, using the aforementioned modified shadow hash key function $H_1(k)$ based on spatial data content contained in second signal data block 1008 and fourth signal data block 1018, computing device 132 determines a refined second elliptical error region probability object 1036 of specific resolved addresses (e.g., locations in the physical spatial domain) of second signal data block 1008, fourth signal data block 1018, and second non-standard data point 1034 with respect to one another. Determination of refined second elliptical error region probability object 1036 by computing device 132 includes determining a refined second center 1038 and a refined second pair of axes (not shown) of refined second elliptical error region probability object 1036. Refined second center 1038 is representative of an updated highest probability location of second signal emitter 34 in the physical spatial domain, and the refined second pair of axes is representative of an updated spatial error (e.g., standard deviation) of refined second center 1038 at the seventh time point. At least one of refined second elliptical error region probability object 1036, refined second center 1038, refined second pair of axes, and updated spatial error (e.g., standard deviation) of refined second center 1038 are at least one of stored in memory 134 and displayed therefrom as human-readable data on display 144.

Also, in an exemplary embodiment, after second non-standard data point 1034 is received and seventh time point has elapsed, a first data cluster 1040 and a second data cluster 1042 reside as stored data in array data structure 401 in memory 134. For first data cluster 1040, refinement of first elliptical error region probability object 418 to refined first elliptical error region probability object 1030 increased the respective spatial error and increased the area of the respective ellipsoid region. The increase in area of the respective ellipsoid object is indicative of the first signal emitter 34 being in a state of motion. Computing device 132 is also configured to determine at least one of a velocity and direction of movement of a mobile signal emitter 2, and further to at least one of store this data in memory 134 and display it therefrom in human-readable form on display 144. In second data cluster 1042, however, the respective spatial error and ellipsoid region area decreased, which indicates that second signal emitter is not mobile. Computing device 132 is also configured to delete at least one of outlier signal data block and at least one outlier non-standard data point from memory 134 using outlier statistical methods performed from software instructions stored on and executed from memory 134. Such outlier statistical methods facilitate efficient usage of memory 134 and prevention of a mischaracterization of a particular signal emitter 2 and/or 34 as mobile when, in fact, it is stationary in the physical spatial domain.

Further, in an exemplary embodiment, when a particular signal emitter 2 and/or 34 has been located in the physical spatial domain with an acceptable error, computing device 132 is configured to delete associated data from sparse array 402, thereby freeing space in memory 134. When a particular signal emitter 2 and/or 34 has not yet been located in the physical spatial domain with an acceptable error, signal processing system 100 continues to deinterleave, filter, and analyze received signals derived from at least one sensor 103 as described above and further refine elliptical error region probability objects 416 until such time that an acceptable degree of error is reached.

Figure 11A:
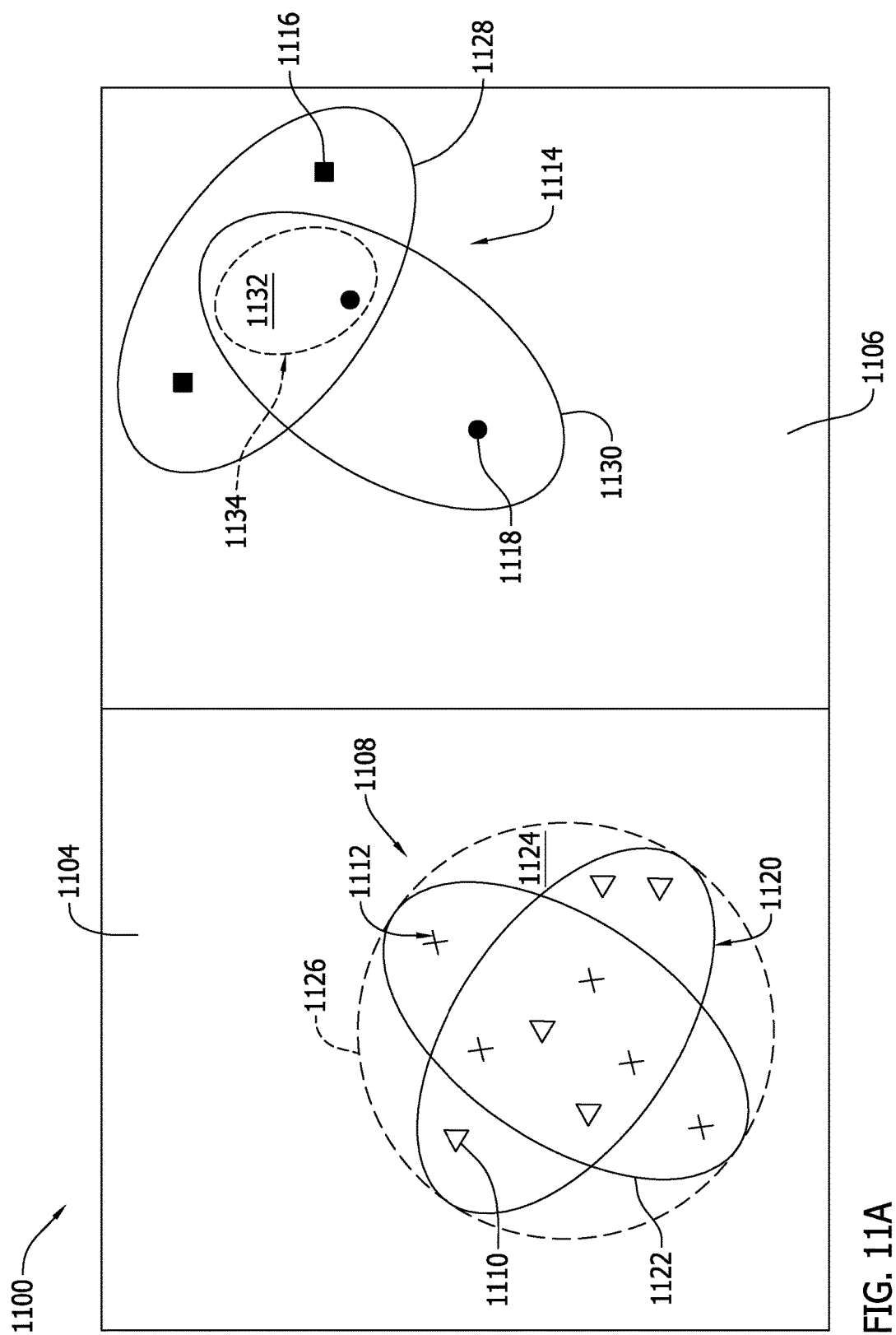
FIG. 11A is an exemplary plot of a union and an intersection of a plurality of elliptical error region probabilities at a first time as determined by the signal processing system shown in FIG. 3.
Figure 11B:
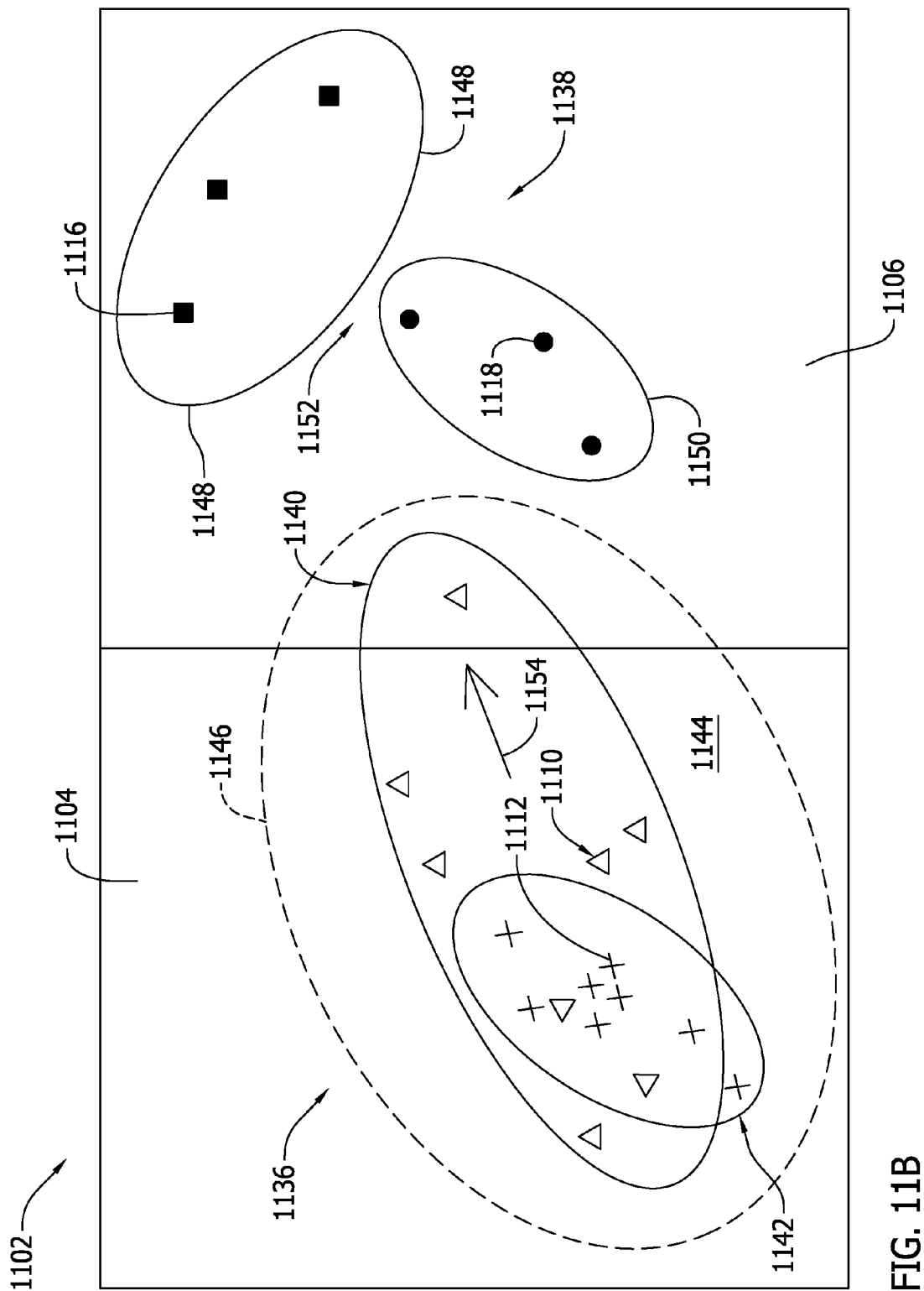
FIG. 11B is an exemplary plot of a union and intersection of a plurality of elliptical error region probabilities at a second time as determined by the signal processing system shown in FIG. 3.

FIG. 11A is an exemplary plot 1100 of a union and an intersection of a plurality of elliptical error region probability objects 416 at a first time as determined by signal processing system 100 shown in FIG. 3. FIG. 11B is an exemplary plot 1102 of a union and an intersection of a plurality of elliptical error region probabilities at a second time (occurring after the first time) as determined by signal processing system 100 shown in FIG. 3. Referring to FIG. 11A, in an exemplary embodiment, plot 1100 includes a first element 1104 and a second element 1106 of the plurality of elements 407 of sparse array 402. Plot 1100 depicts a plurality of elliptical error region probability objects of two signal emitters (2 and/or 34) which have not yet been definitively determined by computing device 132 to be mobile or stationary at the first time point. At the first time point, a first data cluster 1108 represents five signal data blocks 1110 of a first spatial type (denoted by triangles) mapped by computing device 132 (not shown) into first element 1104, as described above. First data cluster 1108 also represents five signal data blocks 1112 of a first non-spatial type (denoted by "X"'s) which computing device 132 associated with a first signal emitter 2 and/or 34 (e.g., but not yet determined to be mobile or stationary). Also, at the first point in time, a second data cluster 1114 represents two signal data blocks 1116 of a second spatial type (denoted by squares) mapped by computing device 132 into second element 1106. Second data cluster 1114 also represents two signal data blocks 1118 of a second non-spatial type (denoted by dots) which computing device 132 associated with a second signal emitter 2 and/or 34 (e.g., but not yet determined to be mobile or stationary).

Also, in an exemplary embodiment, plot 1100 depicts a first elliptical error region probability object 1120 for the five spatial type signal data blocks 1110 determined by computing device 132, as shown and described above. Plot 1100 also depicts a second elliptical error region probability object 1122 for the five non-spatial type signal data blocks 1112. Further, plot 1100 depicts an outer union area 1124 determined by computing device 132 and defined by an outer union ellipsoid 1126 bounding both of first elliptical error region probability object 1120 and second elliptical error region probability object 1122. Similarly, plot 1100 depicts a third elliptical error region probability object 1128 for the two spatial type signal blocks 1116, and plot 1100 depicts a fourth elliptical error region probability object 1130 for the two non-spatial type signal data blocks 1118. Plot 1100 further depicts an inner intersection area 1132 determined by computing device 132 and defined by an inner intersection ellipsoid 1134 bounding a region of overlap (e.g., intersection) shared by both of third elliptical error region probability object 1128 and fourth elliptical error region probability object 1130.

Referring to FIG. 11B, in an exemplary embodiment, plot 1102 depicts a plurality of refined elliptical error region probability objects of two signal emitters 2 and/or 34 at a second point in time. At the second point in time, an updated first data cluster 1136 represents eight (e.g., five from first time point plus an additional three) signal data blocks 1110 of the first spatial type, with seven mapped into first element 1104 and one mapped into second element 1106. Updated first data cluster 1136 also represents eight (e.g., five from first time point plus an additional three) signal data blocks 612 of the first non-spatial type which computing device 132 associated with the first signal emitter 2 (e.g., determined to be mobile, as described below). Also, at the second point in time, an updated second data cluster 1138 represents three (e.g., two from first time point plus an additional one) signal data blocks 1116 of the second spatial type mapped into second element 1106. Updated second data cluster 1138 also represents three (e.g., two from first time point plus an additional one) signal data blocks 618 of the second non-spatial type associated with the second signal emitter 2 and/or 34.

Also, in an exemplary embodiment, plot 1102 depicts a refined (e.g., updated) first elliptical error region probability object 1140 for the eight spatial type signal data blocks 1110 determined by computing device 132. Plot 1102 also depicts a refined second elliptical error region probability object 1142 for the eight non-spatial type signal data blocks 1112. Further, plot 1102 depicts an updated outer union area 1144 determined by computing device 132 and defined by an updated outer union ellipsoid 1146 bounding both of refined first elliptical error region probability object 1140 and refined second elliptical error region probability object 1142. Similarly, plot 1102 depicts a refined third elliptical error region probability object 1148 for the three spatial type signal data blocks 1116, and plot 1102 depicts a refined fourth elliptical error region probability object 1150 for the three non-spatial type signal data blocks 1118. Plot 1102 further depicts a zero-valued (as determined by computing device 132) updated inner intersection area 1152 between refined third elliptical error region probability object 1148 and refined fourth elliptical error region probability object 1150.

Comparing FIG. 11A and FIG. 11B, in an exemplary embodiment, between the first time point depicted in plot 1100 and the second time point depicted in plot 1102, area values for outer union area 1124 and updated outer union area 1144 grew rapidly with a high rate of change (as determined by computing device 132). Also, in an exemplary embodiment, computing device 132 maintained the association between the spatial type signal data blocks 1110 and the non-spatial type signal data blocks 1112 (e.g., all associated with first signal emitter 2). The rapid growth (e.g., positive rate of change) of area values from outer union area 1124 at first time point to updated outer union area 1144 is determined by computing device 132 as indicative of a presence of movement in surveillable area 30 of first mobile signal emitter 2. Computing device 132 is also configured to determine a direction of change 1154 of outer union area 1124 as indicative of a direction of movement of first mobile signal emitter 2 (e.g., from first location 16 to second location 20 in surveillable area 30). Further, in an exemplary embodiment, computing device 132 is also configured to determine at least one of a velocity and an acceleration of at least one mobile signal emitter 2 in surveillable area 30.

Again comparing FIG. 11A and FIG. 11B, in an exemplary embodiment, between the first time point depicted in plot 1100 and the second time point depicted in plot 1102, area values for inner intersection area 1132 and updated inner intersection area 1152 approached zero rapidly with a high rate of change and indeed reached zero (as determined by computing device 132). Also, in an exemplary embodiment, computing device 132 removed (e.g., disjoined) the association between the spatial type signal data blocks 1116 and the non-spatial type signal data blocks 1118 (e.g., not associated with second signal emitter 2 and/or 34). The decay (e.g., negative rate of change) of area values from inner intersection area 1132 at first time point to updated inner intersection area 1152 is determined by computing device 132 to be indicative of a presence of mis-association (e.g., mis-joining) of the spatial type signal data blocks 1116 and the non-spatial type signal data blocks 1118.

In other embodiments, not shown, computing device 132 determines an inner union area (not shown) at the first time point and an updated inner union area (not shown) at the second time point to determine the presence of movement of mobile signal emitter 2. Inner union area is defined by an inner union ellipsoid (not shown) which, for first data cluster 1108, has a different area than outer union area 1124. Likewise, for updated first data cluster 1136, updated inner union area is defined by an updated inner union ellipsoid (not shown) which has a different area than updated outer union area 1144. In still other embodiments, not shown, computing device 132 determines an outer intersection area (not shown) at the first time point and an updated outer intersection area (not shown) at the second time point to determine the presence of mis-joining of the spatial type signal data blocks 1116 and the non-spatial type signal data blocks 1118. Outer intersection area is defined by an outer intersection ellipsoid (not shown) which, for second data cluster 1114, has a different area than inner intersection area 1132. Likewise, for updated second data cluster 1138, updated outer intersection area is defined by an updated outer intersection ellipsoid (not shown) which has a different area than updated inner intersection area 1152.

Figure 12:
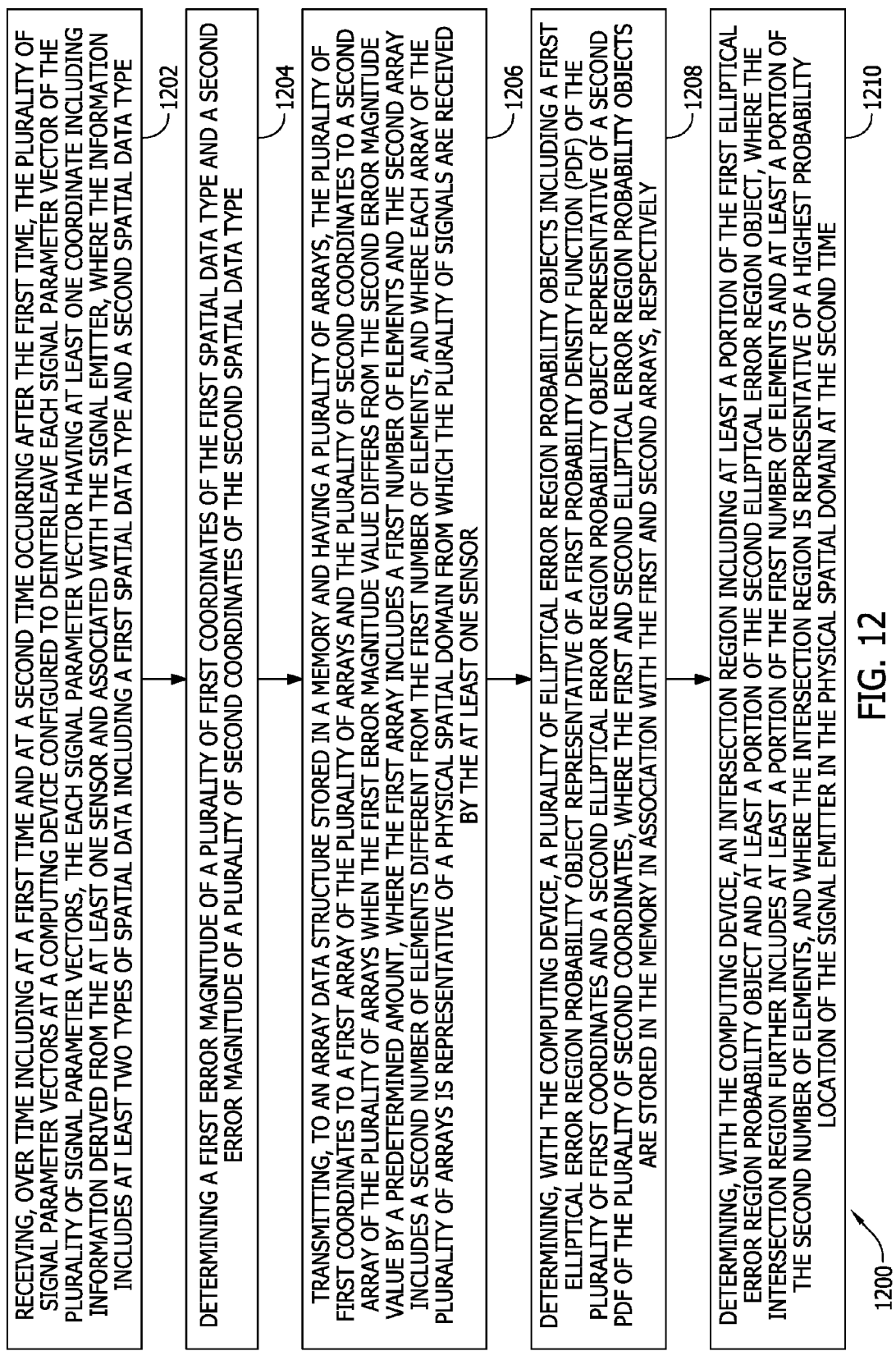
FIG. 12 is a flowchart of an exemplary method of spatial filtering using data with widely varying error magnitudes that may be used with the signal processing system shown in FIG. 3.

FIG. 12 is a flowchart of an exemplary method 1200 of spatial filtering using data with widely varying error magnitudes that may be used with signal processing system 100 shown in FIG. 3. In an exemplary embodiment, method 1200 includes receiving 1202, over time including at a first time and at a second time occurring after the first time, the plurality of signal parameter vector 138 at a computing device 132 configured to deinterleave each signal parameter vector 138 of the plurality of signal parameter vector 138, the each signal parameter vector 138 having at least one coordinate including information derived from the at least one sensor 103 and associated with the signal emitter (e.g., at least one of mobile signal emitter 2 and stationary signal emitter 34), where the information includes at least two types of spatial data including a first spatial data type and a second spatial data type. Method 1200 also includes determining 1204 a first error magnitude of a plurality of first coordinates of the first spatial data type and a second error magnitude of a plurality of second coordinates of the second spatial data type.

Also, in an exemplary embodiment, method 1200 includes transmitting 1206, to an array data structure 401 stored in memory 134 and having a plurality of arrays (e.g., at least two of sparse array 402, medium array 404, and fine array 406), the plurality of first coordinates to a first array (e.g., sparse array 402) of the plurality of arrays and the plurality of second coordinates to a second array (e.g., at least one of medium array 404 and fine array 406) of the plurality of arrays when the first error magnitude differs from the second error magnitude by a predetermined amount, where the first array includes a first number of elements 407 and the second array includes a second number of elements 407 different from the first number of elements, and where each array of the plurality of arrays is representative of a physical spatial domain (e.g., at least one of surveillable area 30 and sky 12) from which the plurality of signals 29 are received by the at least one sensor 103. Method 1200 further includes determining 1208, with computing device 132, a plurality of elliptical error region probability objects 416 including a first elliptical error region probability object 418 representative of a first PDF of the plurality of first coordinates and a second elliptical error region probability object 420 representative of a second PDF of the plurality of second coordinates, where each of first elliptical error region probability object 418 and second elliptical error region probability object 420 is stored in memory 134 in association with at least one of the first array and the second array. Furthermore, in an exemplary embodiment, method 1200 includes determining 1210, with computing device 132, intersection region 812 including at least a portion of first elliptical error region probability object 418 and at least a portion of second elliptical error region probability object 420, where intersection region 812 further includes at least a portion of the first number of elements 407 and at least a portion of the second number of elements 407, and where intersection region 812 is representative of a highest probability location of the signal emitter in the physical spatial domain at the second time.

Figure 13:
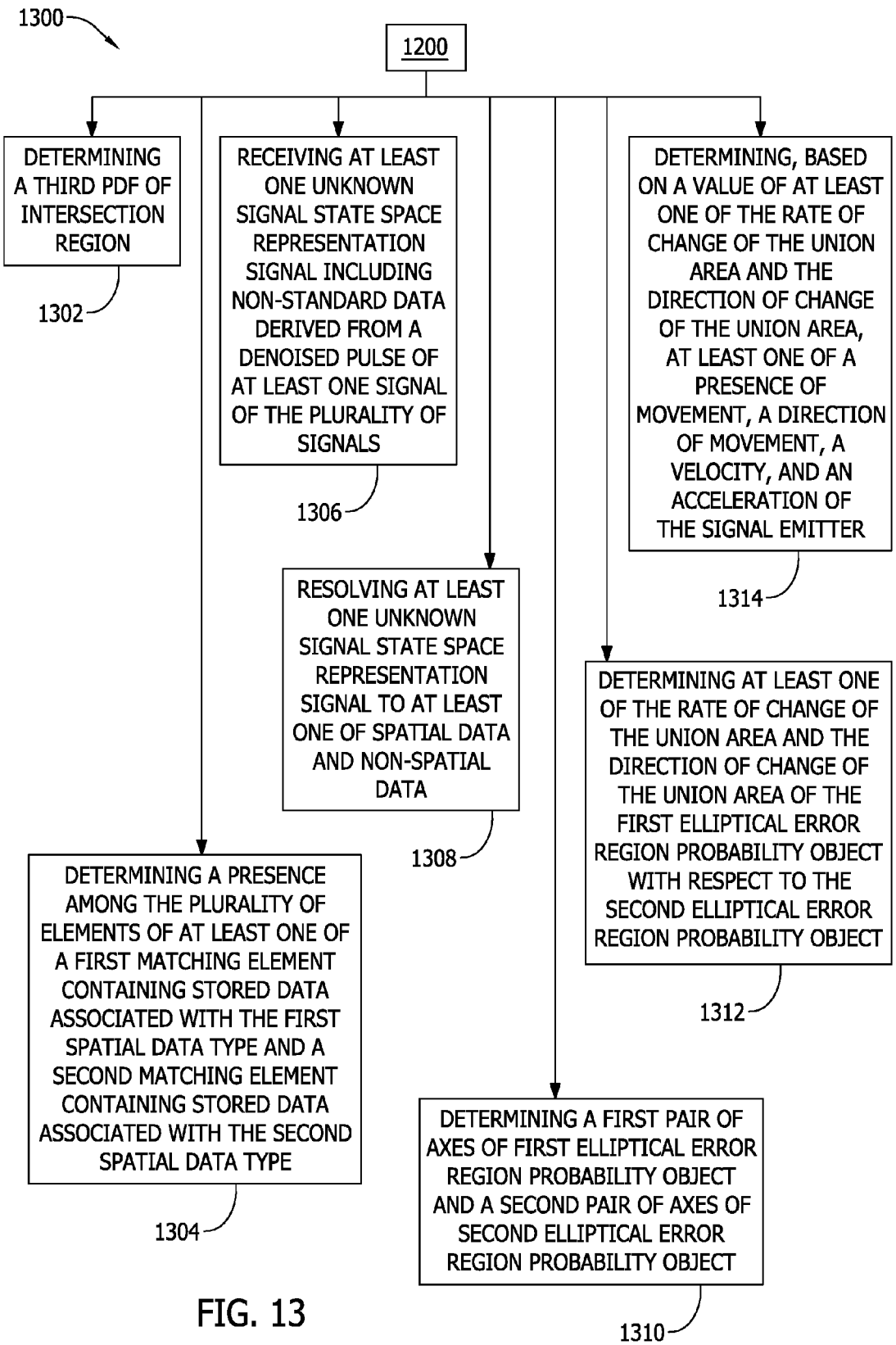
FIG. 13 is flowchart of an alternative method of spatial filtering using data with widely varying error magnitudes that may be used with signal processing system shown in FIG. 3.

FIG. 13 is flowchart of an alternative method 1300 of spatial filtering using data with widely varying error magnitudes that may be used with signal processing system 100 shown in FIG. 3. In an alternative embodiment, method 1300 includes steps of method 1200 as shown and described above with reference to FIG. 12. Method 1300 also includes determining 1302, with computing device 132, a third PDF of intersection region 812, where the third PDF is representative of a spatial error associated with highest probability location 16 at the second time. Method 1300 further includes determining 1304, using shadow hash key routine 408 executed using computing device 132, a presence among the plurality of elements 407 of at least one of a first matching element 407 containing stored data associated with the first spatial data type and a second matching element 407 containing stored data associated with the second spatial data type. Also, in determining 1304, array data structure 401 is configured to function as a hash table, and the presence of the first and second matching elements 407 is a prerequisite to determining 1208 first 418 and second 420 elliptical error region probability objects, respectively. Method 1300 also includes receiving 1306, at computing device 132, at least one unknown signal state space representation signal 139 including non-standard data points 1026 and/or 1034 derived from denoised pulse 130 of at least one signal of the plurality of signals 29. Method 1300 further includes resolving 1308, at computing device 132, at least one unknown signal state space representation signal 139 to at least one of spatial data and non-spatial data.

Method 1300 also includes determining 1310, with computing device 132, a first pair of axes of first elliptical error region probability object 418 and a second pair of axes of second elliptical error region probability object 420, where first pair of axes is representative of the spatial error of the plurality of first coordinates 1004 and second pair of axes is representative of the spatial error of the plurality of second coordinates 1008. Method 1300 further includes determining 1312, with computing device 132, at least one of the rate of change of union area 1124 and/or 1126 and the direction of change 1154 of union area 1124 and/or 1126 of first elliptical error region probability object 418 with respect to the second elliptical error region probability object 420. Method 1300 also includes determining 1314, with computing device 132 and based on a value of at least one of the rate of change of the union area 1124 and/or 1126 and the direction of change 1154 of the union area, at least one of a presence of movement of signal emitter (e.g., at least one of signal emitters 2, 8, 34, and 36), a direction of movement of the signal emitter, a velocity of the signal emitter, and an acceleration of the signal emitter.

Figure 14:
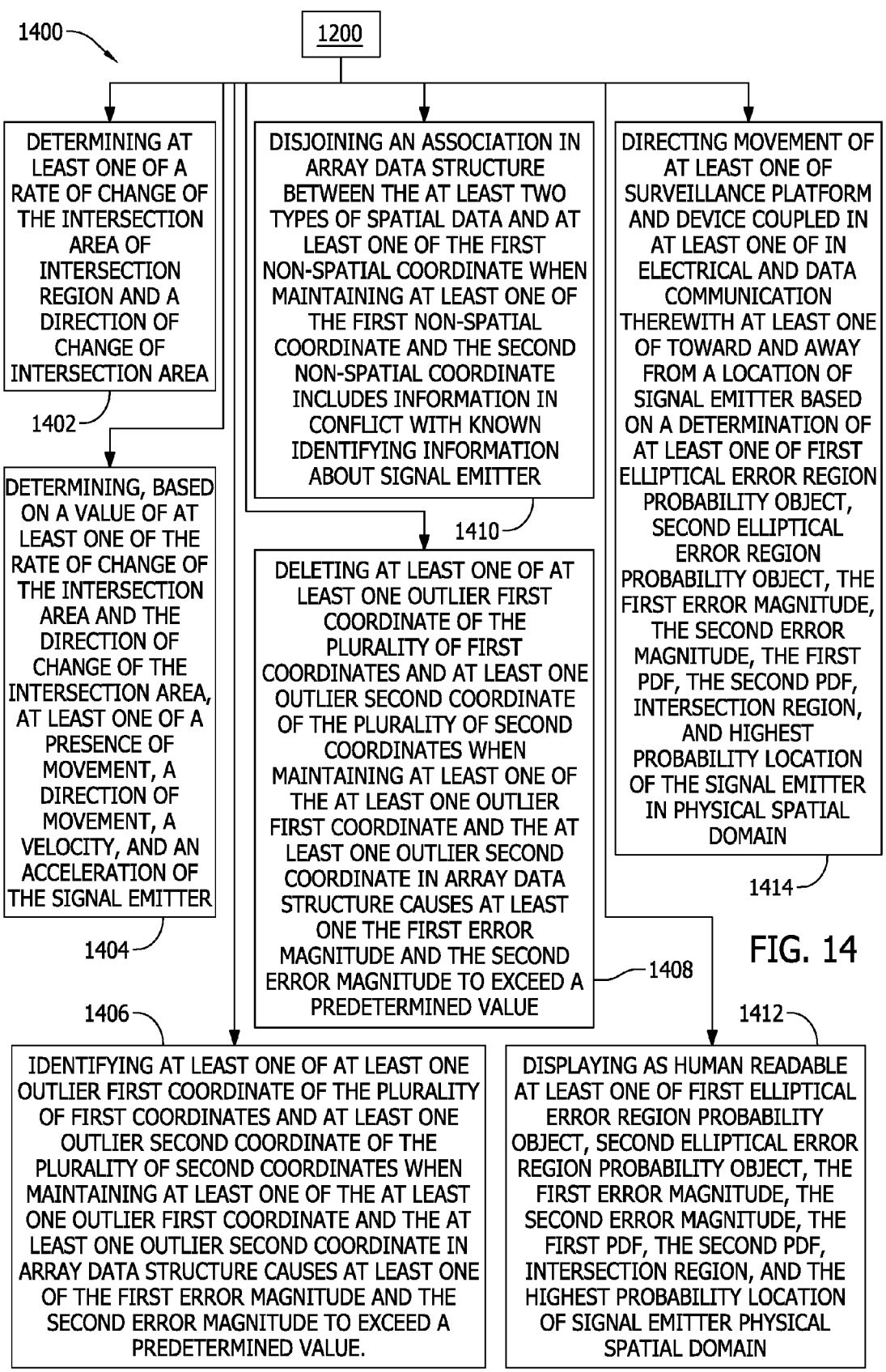
FIG. 14 is flowchart of an alternative method of spatial filtering using data with widely varying error magnitudes that may be used with signal processing system shown in FIG. 3.

FIG. 14 is flowchart of an alternative method 1400 of spatial filtering using data with widely varying error magnitudes that may be used with signal processing system 100 shown in FIG. 3. In an alternative embodiment, method 1400 includes steps of method 1200 as shown and described above with reference to FIG. 12. Method 1400 also includes determining 1402, with computing device 132, at least one of a rate of change of intersection area 1132 and/or 1134 of intersection region 812 and a direction of change 1154 of intersection area 1132 and/or 1134. Method 1400 further includes determining 1404, with computing device 132 and based on a value of at least one of the rate of change of intersection area 1132 and the direction of change 1154 of intersection area 1132 and/or 1134, at least one of a presence of movement of signal emitter (e.g., at least one of signal emitters 2, 8, 34, and 36), a direction of movement of the signal emitter, a velocity of the signal emitter, and an acceleration of the signal emitter.

Method 1400 also includes at least one of identifying 1406 and deleting 1408, with computing device 132, at least one of at least one outlier first coordinate of the plurality of first coordinates 1004 and at least one outlier second coordinate of the plurality of second coordinates 1008 when maintaining at least one of the at least one outlier first coordinate and the at least one outlier second coordinate in array data structure 401 causes at least one of the first error magnitude and the second error magnitude to exceed a predetermined value. Method 1400 further includes disjoining 1410, using computing device 132, an association in array data structure 401 between the at least two types of spatial data and at least one of the first non-spatial coordinate and the second non-spatial coordinate when maintaining at least one of the first non-spatial coordinate and the second non-spatial coordinate includes information in conflict with known identifying information about signal emitter.

Method 1400 also includes displaying 1412 data output signal 142 as human readable data via display 144 coupled to computing device 132, at least one of first elliptical error region probability object 418, second elliptical error region probability object 420, the first error magnitude, the second error magnitude, the first PDF, the second PDF, intersection region 812, and the highest probability location 16 of signal emitter in physical spatial domain 1 and/or 33. Method 1400 further includes directing 1414 movement of at least one of surveillance platform 6 and device 31 coupled in at least one of in electrical and data communication therewith at least one of toward and away from a location 16 of signal emitter based on a determination of at least one of first elliptical error region probability object 418, second elliptical error region probability object 420, the first error magnitude, the second error magnitude, the first PDF, the second PDF, intersection region 812, and highest probability location (e.g., first location 16) of the signal emitter in physical spatial domain 1 and/or 33.

Figure 15:
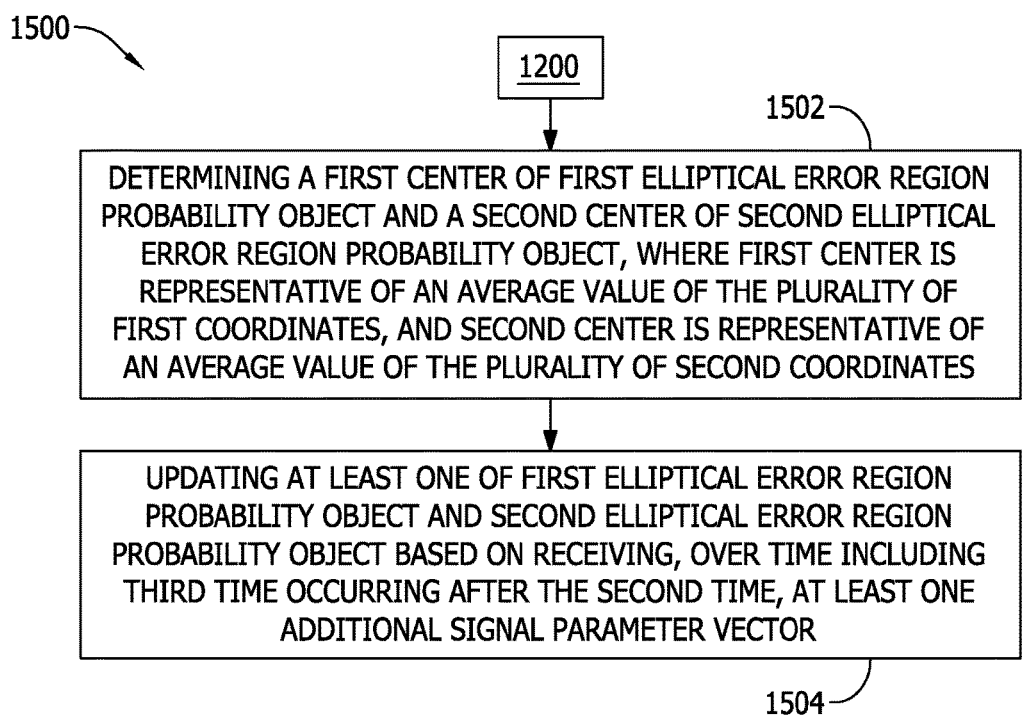
FIG. 15 is flowchart of an alternative method of spatial filtering using data with widely varying error magnitudes that may be used with signal processing system shown in FIG. 3.

FIG. 15 is flowchart of an alternative method 1500 of spatial filtering using data with widely varying error magnitudes that may be used with signal processing system 100 shown in FIG. 3. In an alternative embodiment, method 1500 includes steps of method 1200 as shown and described above with reference to FIG. 12. Method 1500 also includes determining 1502, with computing device 132, a first center 1016 of first elliptical error region probability object 418 and a second center 1022 of second elliptical error region probability object 420, where first center 1016 is representative of an average value of the plurality of first coordinates 1004, and second center 1022 is representative of an average value of the plurality of second coordinates 1008. Also, in determining 1502, first center 1016 is further representative of the location 16 of signal emitter (e.g., at least one of signal emitters 2, 8, 34, and 36) in physical spatial domain 1 and/or 33 based upon the plurality of first coordinates 1004, and the first PDF of first elliptical error region probability object 418 is representative of a spatial error of location 16 of signal emitter in physical spatial domain 1 and/or 33 based on the plurality of first coordinates 1004. Further, in determining 1502, second center 1022 is further representative of location 16 of signal emitter in physical spatial domain 1 and/or 33 based upon the plurality of second coordinates 1008, and the second PDF of second elliptical error region probability object 420 is representative of a spatial error of location 16 of signal emitter in physical spatial domain 1 and/or 33 based upon the plurality of second coordinates 1008. Method 1500 further includes updating 1504, with computing device 132, at least one of first elliptical error region probability object 418 and second elliptical error region probability object 420 based on receiving 1202, over time including third time occurring after the second time, at least one additional signal parameter vector 138. Updating 1504 also includes updating at least one of the first PDF, the second PDF, first center 1016, second center 1022, the first pair of axes, and the second pair of axes.

The above-described systems and methods for spatial filtering using data with widely different error magnitudes generated by wide area surveillance sensors enable effective and efficient reception and classification of signals where spatial data having differing numbers of dimensions and widely varying error magnitudes. The above-described embodiments also facilitate separation of signal from noise and interference where the number of signals of interest is large and spatial content is a priority for classification. The above-described embodiments further simplify processing required for cancellation of noise and interference in order to spatially match information between multiple sampling frames, including with spatial data derived from more than one sensor fused together. The above-described systems and methods for spatial filtering using data with widely different error magnitudes generated by wide area surveillance sensors also facilitate efficient locational matching where the spatial area surveilled by a wide area sensor is large and spatial data has different numbers of dimensions and widely varying error magnitudes using simpler processing architectures relative to known spatial filtering systems and methods. The above-described embodiments further enable improved detection range, processing and classification performance, and reduced power consumption in aerial surveillance operations without increasing computing resources beyond limitations on design constraints. The above-described systems and methods for spatial filtering using data with widely different error magnitudes generated by wide area surveillance sensors also facilitate efficient and effective high performance post-processing of spatial data obtained from wide area sensors surveilling large spatial areas. The above-described embodiments also enable statistically joining together over time spatial data-containing vectors having differing numbers of dimensions and widely varying error magnitudes. The above-described embodiments further facilitate discerning between stationary and moving signal emitters with an acceptable error using spatial data obtained from wide area sensors.

An exemplary technical effect of the above-described systems and methods for spatial filtering using data with widely different error magnitudes generated by wide area surveillance sensors includes at least one of the following: (a) enabling effective and efficient reception and classification of signals where spatial data having differing numbers of dimensions and widely varying error magnitudes; (b) facilitating separation of signal from noise and interference where the number of signals of interest is large and spatial content is a priority for classification; (c) simplifying processing required for cancellation of noise and interference in order to spatially match information between multiple sampling frames, including with spatial data derived from more than one sensor fused together; (d) facilitating efficient locational matching where the spatial area surveilled by a wide area sensor is large and spatial data has different numbers of dimensions and widely varying error magnitudes using simpler processing architectures relative to known spatial filtering systems and methods; (e) enabling improved detection range, processing and classification performance, and reduced power consumption in aerial surveillance operations without increasing computing resources beyond limitations on design constraints; (f) facilitate efficient and effective high performance post-processing of spatial data obtained from wide area sensors surveilling large spatial areas; (g) enabling statistically joining together over time spatial data-containing vectors derived from wide area sensors and having differing numbers of dimensions and widely varying error magnitudes; and (h) facilitating discerning between stationary and moving signal emitters with an acceptable error using spatial data obtained from wide area sensors.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system (100) for spatially filtering data derived from a plurality of signals (29) generated by a signal emitter (2,8,34,36) and received by at least one surveillance platform (6), said system comprising:

at least one sensor (103) configured to receive the plurality of signals;

a pre-processor (104) coupled to the sensor and configured to generate a plurality of signal parameter vectors (138), each signal parameter vector of the plurality of signal parameter vectors derived from one signal of the plurality of signals and including at least one coordinate (612,618,1004,1008,1012,1018,1024,1110,1112, 1116,1118) including information derived from the at least one sensor and associated with the signal emitter, wherein the information includes at least two types of spatial data including a first spatial data type and a second spatial data type; and a computing device (132) coupled to the pre-processor and including a memory (134), the computing device configured to deinterleave the each signal parameter vector of the plurality of signal parameter vectors, wherein the computing device is programmed to:

receive (1202), over time including at a first time and at a second time occurring after the first time, the plurality of signal parameter vectors from the pre-processor;

determine (1204) a first error magnitude of a plurality of first coordinates of the first spatial data type and a second error magnitude of a plurality of second coordinates of the second spatial data type;

transmit (1206), to an array data structure (401) stored in the memory and having a plurality of arrays (402,404,406), the plurality of first coordinates to a first array of the plurality of arrays and the plurality of second coordinates to a second array of the plurality of arrays when the first error magnitude differs from the second error magnitude by a predetermined amount, wherein the first array includes a first number of elements (407) and the second array includes a second number of elements different from the first number of elements, and wherein each array of the plurality of arrays is representative of a physical spatial domain (1,33) from which the plurality of signals are received by the at least one sensor;

determine (1208) a plurality of elliptical error region probability objects (416) including a first elliptical error region probability object (418) representative of a first probability density function ("PDF") of the plurality of first coordinates and a second elliptical error region probability object (420) representative of a second "PDF" of the plurality of second coordinates, wherein each of the first elliptical error region probability object and the second elliptical error region probability object is stored in the memory in association with at least one of the first array and the second array;

determine (1210) an intersection region (812) including at least a portion of the first elliptical error region probability object and at least a portion of the second elliptical error region probability object, wherein the intersection region further includes at least a portion of the first number of elements and at least a portion of the second number of elements, and wherein the intersection region is representative of a highest probability location (16) of the signal emitter in the physical spatial domain at the second time;

determine (1312,1402) at least one of i) a rate of change of a union area (1124,1126), ii) a direction of change (1154) of the union area of the first elliptical error region probability object with respect to the second elliptical error region probability object, iii) a rate of change of an intersection area (1132,1134) of the intersection region, and iv) a direction of change (1154) of the intersection area; and determine (1314,1404), based on a value of at least one of i) the rate of change of the union area, ii) the direction of change of the union area, iii) the rate of change of the intersection area, and iv) the direction of change of the intersection area, at least one of:

a presence of movement of the signal emitter;
a direction of movement of the signal emitter;
a velocity of the signal emitter; and
an acceleration of the signal emitter.

2. The system (100) in accordance with claim 1, wherein the computing device (132) is further programmed to determine (1302), a third "PDF" of the intersection region (812), wherein the third "PDF" is representative of a spatial error associated with the highest probability location (16) at the second time.

3. The system (100) in accordance with claim 1, wherein the computing device (132) is further programmed to receive (1202) at least one standard deviation vector (502) associated with at least one signal parameter vector (138) of the plurality of signal parameter vectors, the at least one standard deviation vector configured to facilitate determining the first error magnitude and the second error magnitude.

4. The system (100) in accordance with claim 1, wherein each array (402,404,406) of the plurality of arrays includes a plurality of elements (407), and wherein the computing device (132) is further programmed to determine (1304), using a shadow hash key routine (408), a presence among the plurality of elements of at least one of a first matching element containing stored data associated with the first spatial data type and a second matching element containing stored data associated with the second spatial data type, wherein the array data structure (401) is configured to function as a hash table and the presence of the first and second matching elements is a prerequisite to determining the first (418) and second (420) elliptical error region probability objects, respectively.

5. The system (100) in accordance with claim 1, wherein the computing device (132) is further programmed to receive (1202) at least one signal parameter vector (138) of the plurality of signal parameter vectors as a signal parameter vector generated from at least one of a denoised signal (124) and a blind source separated signal (120).

6. The system (100) in accordance with claim 1, wherein the computing device (132) is further programmed to:

receive (1306) at least one unknown signal state space representation signal (139) including non-standard data (1026,1034) derived from a denoised pulse (130) of at least one signal of the plurality of signals (29); and resolve (1308) the at least one unknown signal state space representation signal to at least one of spatial data and non-spatial data.

7. The system (100) in accordance with claim 1, wherein the computing device (132) is further programmed to:

receive (1202) the plurality of signal parameter vectors (138) having a plurality of non-spatial coordinates (612,618,1004,1008,1012,1018,1024,1110,1112, 1116, 1118) including a first non-spatial coordinate and a second non-spatial coordinate, each non-spatial coordinate of the plurality of non-spatial coordinates including information including at least one type of non-spatial data identifying the signal emitter (2,8,34,36);

at least one of identify (1406) and delete (1408) at least one of at least one outlier first coordinate of the plurality of first coordinates (1004) and at least one outlier second coordinate of the plurality of second coordinates (1008) when maintaining at least one of the at least one outlier first coordinate and the at least one outlier second coordinate in the array data structure (401) causes at least one of the first error magnitude and the second error magnitude to exceed a predetermined value; and disjoin (1410) an association in the array data structure between the at least two types of spatial data and at least one of the first non-spatial coordinate and the second non-spatial coordinate when maintaining at least one of the first non-spatial coordinate and the second non-spatial coordinate includes information in conflict with known identifying information about the signal emitter.

8. The system (100) in accordance with claim 1 further comprising a display (144) coupled to the computing device (132), wherein the computing device is further programmed to display (1412) as human readable data via the display at least one of the first elliptical error probability object (418), the second elliptical error region probability object (420), the first error magnitude, the second error magnitude, the first "PDF", the second "PDF", the intersection region (812), and the highest probability location (16) of the signal emitter (2,8,34,36) in the physical spatial domain (1,33).

9. The system (100) in accordance with claim 1 further comprising a device (31) coupled in at least one of electrical and data communication with the at least one surveillance platform (6), wherein the computing device (132) is further programmed to direct (1414) movement of the device at least one of toward and away from a location (16) of the signal emitter (2,8,34,36) based on a determination of at least one of the first elliptical error region probability object (418), the second elliptical error region probability object (418), the first error magnitude, the second error magnitude, the first "PDF", the second "PDF", the intersection region (812), and the highest probability location (16) of the signal emitter in the physical spatial domain (1,33).

10. The system (100) in accordance with claim 1, wherein the computing device (132) is further programmed to determine (1310) a first pair of axes of the first elliptical error region probability object (418) and a second pair of axes of the second elliptical error region probability object (420), wherein the first pair of axes is representative of a spatial error of the plurality of first coordinates (1004), and wherein the second pair of axes is representative of a spatial error of the plurality of second coordinates (1008).

11. The system (100) in accordance with claim 10, wherein the computing device (132) is further programmed to determine (1502) a first center (1016) of the first elliptical error region probability object (418) and a second center (1022) of the second elliptical error region probability object (420), wherein the first center is representative of an average value of the plurality of first coordinates (1004), and wherein the second center is representative of an average value of the plurality of second coordinates (1008).

12. The system (100) in accordance with claim 11, wherein:

the first center (1016) is further representative of the location (16) of the signal emitter (2,8,34,36) in the physical spatial domain (1,33) based upon the plurality of first coordinates (1004);

the first "PDF" of the first elliptical error region probability object (418) is representative of a spatial error of the location of the signal emitter;

the second center (1022) is further representative of the location of the signal emitter in the physical spatial domain based upon the plurality of second coordinates (1008); and the second "PDF" of the second elliptical error region probability object (420) is representative of a spatial error of the location of the signal emitter in the physical spatial domain based upon the plurality of second coordinates.

13. The system (100) in accordance with claim 12, wherein the computing device (132) is further programmed to update (1504) at least one of the first elliptical error region probability object (418) and the second elliptical error region probability object (420) based on receiving (1202), over time including a third time occurring after the second time, at least one additional signal parameter vector (138).

14. The system (100) in accordance with claim 13, wherein the computing device (132) is further programmed to update (1504) at least one of the first "PDF", the second "PDF", the first center (1016), the second center (1022), the first pair of axes, and the second pair of axes.

15. A method (1200) for spatially filtering data from a plurality of signal parameter vectors (138) generated by at least one surveillance platform (6) including at least one sensor (103) configured to receive a plurality of signals (29) from a signal emitter (2,8,34,36), each signal parameter vector derived from one signal of the plurality of signals, said method comprising:

receiving (1202), over time including at a first time and at a second time occurring after the first time, the plurality of signal parameter vectors at a computing device (132) configured to deinterleave each signal parameter vector of the plurality of signal parameter vectors, the each signal parameter vector having at least one coordinate (612,618,1004,1008,1012,1018,1024,1110,1112,1116, 1118) including information derived from the at least one sensor and associated with the signal emitter, wherein the information includes at least two types of spatial data including a first spatial data type and a second spatial data type;

determining (1204) a first error magnitude of a plurality of first coordinates (1004) of the first spatial data type and a second error magnitude of a plurality of second coordinates (1008) of the second spatial data type;

transmitting (1206), to an array data structure (401) stored in a memory (134) and having a plurality of arrays (402,402,406), the plurality of first coordinates to a first array of the plurality of arrays and the plurality of second coordinates to a second array of the plurality of arrays when the first error magnitude differs from the second error magnitude by a predetermined amount, wherein the first array includes a first number of elements (407) and the second array includes a second number of elements different from the first number of elements, and wherein each array of the plurality of arrays is representative of a physical spatial domain (1,33) from which the plurality of signals are received by the at least one sensor;

determining (1208), with the computing device, a plurality of elliptical error region probability objects (416) including a first elliptical error region probability object (418) representative of a first probability density function ("PDF") of the plurality of first coordinates and a second elliptical error region probability object (420) representative of a second "PDF" of the plurality of second coordinates, wherein each of the first elliptical error region probability object and the second elliptical error region probability object is stored in the memory in association with at least one of the first array and the second array;

determining (1210), with the computing device, an intersection region (812) including at least a portion of the first elliptical error region probability object and at least a portion of the second elliptical error region probability object, wherein the intersection region further includes at least a portion of the first number of elements and at least a portion of the second number of elements, and wherein the intersection region is representative of a highest probability location (16) of the signal emitter in the physical spatial domain at the second time;

determining (1312,1402) at least one of i) a rate of change of a union area (1124,1126), ii) a direction of change (1154) of the union area of the first elliptical error region probability object with respect to the second elliptical error region probability object, iii) a rate of change of an intersection area (1132,1134) of the intersection region, and iv) a direction of change (1154) of the intersection area; and determining (1314,1404), based on a value of at least one of i) the rate of change of the union area, ii) the direction of change of the union area, iii) the rate of change of the intersection area, and iv) the direction of change of the intersection area, at least one of:

a presence of movement of the signal emitter;
a direction of movement of the signal emitter;
a velocity of the signal emitter; and
an acceleration of the signal emitter.

16. The method (1200) in accordance with claim 15, wherein receiving (1202) the plurality of signal parameter vectors (138) comprises receiving at least one signal parameter vector of the plurality of signal parameter vectors as a signal parameter vector generated from at least one of a denoised signal (124) and a blind source separated signal (129).

17. The method (1200) in accordance with claim 15, wherein receiving (1202) the plurality of signal parameter vectors (138) comprises receiving at least one standard deviation vector (502) associated with at least one signal parameter vector (138) of the plurality of signal parameter vectors, the at least one standard deviation vector configured to facilitate determining (1204) the first error magnitude and the second error magnitude.

18. The method (1300) in accordance with claim 15 further comprising determining (1302), with the computing device (132), a third "PDF" of the intersection region (812), wherein the third "PDF" is representative of a spatial error associated with the highest probability location (16) at the second time.

19. The method (1300) in accordance with claim 15, wherein each array (402,404,406) of the plurality of arrays includes a plurality of elements (407), said method further comprising determining (1304), using a shadow hash key routine (408) executed using the computing device (132), a presence among the plurality of elements of at least one of a first matching element containing stored data associated with the first spatial data type and a second matching element containing stored data associated with the second spatial data type, and wherein:
   the array data structure (401) is configured to function as a hash table; and
   the presence of the first and second matching elements is a prerequisite to determining (1208) the first (418) and second (420) elliptical error region probability objects, respectively.

20. The method (1300) in accordance with claim 15 further comprising:
   receiving (1306), at the computing device (132), at least one unknown signal state space representation signal (139) including non-standard data (1026,1034) derived from a denoised pulse (130) of at least one signal of the plurality of signals (29); and
   resolving (1308), with the computing device, the at least one unknown signal state space representation signal to at least one of spatial data and non-spatial data.

21. The method (1300) in accordance with claim 15 further comprising determining (1310), with the computing device (132), a first pair of axes of the first elliptical error region probability object (418) and a second pair of axes of the second elliptical error region probability object (420), wherein:
   the first pair of axes is representative of a spatial error of the plurality of first coordinates (1004); and
   the second pair of axes is representative of a spatial error of the plurality of second coordinates (1008).

22. The method (1400) in accordance with claim 15, wherein receiving (1202) the plurality of signal parameter vectors (138) comprises receiving a plurality of non-spatial coordinates (612,618,1004,1008,1012,1018,1024,1110, 1112, 1116,1118) including a first non-spatial coordinate and a second non-spatial coordinate, each non-spatial coordinate of the plurality of non-spatial coordinates including information including at least one type of non-spatial data identifying the signal emitter (2,8,34,36), said method further comprising:
   at least one of identifying (1406) and deleting (1408), with the computing device, at least one of at least one outlier first coordinate of the plurality of first coordinates (1004) and at least one outlier second coordinate of the plurality of second coordinates (1008) when maintaining at least one of the at least one outlier first coordinate and the at least one outlier second coordinate in the array data structure (401) causes at least one of the first error magnitude and the second error magnitude to exceed a predetermined value; and
   disjoining (1410), using the computing device, an association in the array data structure between the at least two types of spatial data and at least one of the first non-spatial coordinate and the second non-spatial coordinate when maintaining at least one of the first non-spatial coordinate and the second non-spatial coordinate includes information in conflict with known identifying information about the signal emitter.

23. The method (1400) in accordance with claim 15 further comprising displaying (1412) as human readable data via a display (144) coupled to the computing device (132), at least one of the first elliptical error region probability object (418), the second elliptical error region probability object (420), the first error magnitude, the second error magnitude, the first "PDF", the second "PDF", the intersection region (812), and the highest probability location (16) of the signal emitter (2,8,34,36) in the physical spatial domain (1,33).

24. The method (1400) in accordance with claim 15 further comprising directing (1414) movement of at least one of the at least one surveillance platform (6) and a device (31) coupled in at least one of in electrical and data communication therewith at least one of toward and away from a location (16) of the signal emitter (2,8,34,36) based on a determination of at least one of the first elliptical error region probability object (418), the second elliptical error region probability object (420), the first error magnitude, the second error magnitude, the first "PDF", the second "PDF", the intersection region (812), and the highest probability location (16) of the signal emitter in the physical spatial domain (1,33).

25. The method (1500) in accordance with claim 15 further comprising determining (1502), with the computing device (132), a first center (1016) of the first elliptical error region probability object (418) and a second center (1022) of the second elliptical error region probability object (420), wherein:
   the first center is representative of an average value of the plurality of first coordinates (1004); and
   the second center is representative of an average value of the plurality of second coordinates (1008).

26. The method (1500) in accordance with claim 25, wherein:
   the first center (1016) is further representative of the location (16) of the signal emitter (2,8,34,36) in the physical spatial domain (1,33) based upon the plurality of first coordinates (1004);
   the first "PDF" of the first elliptical error region probability object (418) is representative of a spatial error of the location of the signal emitter in the physical spatial domain based upon the plurality of first coordinates;
   the second center (1022) is further representative of the location of the signal emitter in the physical spatial domain based upon the plurality of second coordinates (1008); and
   the second "PDF" of the second elliptical error region probability object (420) is representative of a spatial error of the location of the signal emitter in the physical spatial domain based upon the plurality of second coordinates.

27. The method (1500) in accordance with claim 26 further comprising updating (1504), with the computing device (132), at least one of the first elliptical error region probability object (418) and the second elliptical error region probability object (420) based on receiving (1202), over time including third time occurring after the second time, at least one additional signal parameter vector (138).

28. The method (1500) in accordance with claim 27, wherein updating (1504) at least one of the first elliptical error region probability object (418) and the second elliptical error region probability object (420) comprises updating at least one of the first "PDF", the second "PDF", the first center (1016), the second center (1022), a first pair of axes of the first elliptical error region probability object, and a second pair of axes of the second elliptical error region probability object.

29. A non-transient computer-readable memory (134) having computer-executable instructions embodied thereon, wherein when executed by a computing device (132), the computer-executable instructions cause the computing device to:
   receive (1202), over time including at a first time and at a second time occurring after the first time, a plurality of signal parameter vectors (138) including a plurality of first coordinates (1004) of a first spatial data type and a plurality of second coordinates (1008) of a second spatial data type, each signal parameter vector of the plurality of signal parameter vectors derived from one signal of a plurality of signals (29) generated by a signal emitter (2,8,34,36) and received by at least one sensor (103);

determine (1204) a first error magnitude of a plurality of first coordinates and a second error magnitude of a plurality of second coordinates;

transmit (1206), to an array data structure (401) stored in the memory (134) and having a plurality of arrays (402,404,406), the plurality of first coordinates to a first array of the plurality of arrays and the plurality of second coordinates to a second array of the plurality of arrays when the first error magnitude differs from the second error magnitude by a predetermined amount, wherein the first array includes a first number of elements (401) and the second array includes a second number of elements different from the first number of elements, and wherein each array of the plurality of arrays is representative of a physical spatial domain (1,33) from which the plurality of signals are received by the at least one sensor;

determine (1208) a plurality of elliptical error region probability objects (416) including a first elliptical error region probability object (418) representative of a first probability density function ("PDF") of the plurality of first coordinates and a second elliptical error region probability object (420) representative of a second "PDF" of the plurality of second coordinates, wherein each of the first elliptical error region probability object and the second elliptical error region probability object is stored in the memory in association with at least one of the first array and the second array;

determine (1210) an intersection region (812) including at least a portion of the first elliptical error region probability object and at least a portion of the second elliptical error region probability object, wherein the intersection region further includes at least a portion of the first number of elements and at least a portion of the second number of elements, and wherein the intersection region is representative of a highest probability location (16) of the signal emitter in the physical spatial domain at the second time;

determine (1312,1402) at least one of i) a rate of change of a union area (1124,1126), ii) a direction of change (1154) of the union area of the first elliptical error region probability object with respect to the second elliptical error region probability object, iii) a rate of change of an intersection area (1132,1134) of the intersection region, and iv) a direction of change (1154) of the intersection area; and determine (1314,1404), based on a value of at least one of i) the rate of change of the union area, ii) the direction of change of the union area, iii) the rate of change of the intersection area, and iv) the direction of change of the intersection area, at least one of:
a presence of movement of the signal emitter;
a direction of movement of the signal emitter;
a velocity of the signal emitter; and
an acceleration of the signal emitter.

\* \* \* \* \*